(12) United States Patent
Itoh et al.

(10) Patent No.: US 6,553,647 B1
(45) Date of Patent: Apr. 29, 2003

(54) METHOD OF WIRING A HEAD SUSPENSION ASSEMBLY

(75) Inventors: Kenji Itoh, Fujisawa (JP); Hiroyasu Tsuchida, Yokohama (JP); Tatsushi Yoshida, Chigasaki (JP); Yoskio Uematsu, Fujisawa (JP); Tetsuji Ono, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 09/630,861

(22) Filed: Aug. 2, 2000

(30) Foreign Application Priority Data

Sep. 13, 1999 (JP) .............................................. 11-259070

(51) Int. Cl.⁷ .......................... G11B 5/127; H04R 31/00
(52) U.S. Cl. ............... 29/603.06; 29/592.1; 29/603.04; 29/860; 29/861; 29/867; 228/1.1; 228/4.5; 228/110.1; 228/180.5; 156/73.1; 156/73.2; 219/121.69; 219/121.72; 219/121.85; 360/234.5; 360/245.8
(58) Field of Search .......................... 29/592.1, 603.01, 29/603.04, 603.06, 860, 861, 867; 228/1.1, 4.5, 110.1, 180.5; 156/73.1, 73.2; 219/121.69, 121.72, 121.85; 360/234.5, 245.8

(56) References Cited

U.S. PATENT DOCUMENTS

| | | | | |
|---|---|---|---|---|
| 4,128,979 A | * | 12/1978 | Price | 52/241 |
| 6,075,674 A | * | 6/2000 | Aoyagi et al. | 360/245.8 |
| 6,219,202 B1 | * | 4/2001 | Palmer | 360/234.5 |
| 6,382,499 B1 | * | 5/2002 | Satoh et al. | 228/173.1 |

\* cited by examiner

*Primary Examiner*—Peter Vo
*Assistant Examiner*—Paul Kim
(74) *Attorney, Agent, or Firm*—Abdy Raissinia; Bracewell & Patterson, L.L.P.

(57) ABSTRACT

A method of wiring a head suspension assembly includes fixing a tube binding a plurality of wires on a suspension assembly, and fixing the wires extending from the fixed tube on the suspension while leading them to a top side of the suspension. The suspension has a tab frame with first and second frames. Each wire led to the top side of the suspension is bonded to the second frame of a tab frame. An insulation film is removed from each connecting portion of the wires to connect the wires to respective connecting pads of the slider. A first frame is bent substantially perpendicular to the suspension, and the second frame is bent substantially perpendicular to the first frame, thereby positioning the wires bonded to the second frame at the connecting pads on the slider. The wires are then ultrasonically welded to the respective connecting pads on the slider.

2 Claims, 12 Drawing Sheets

METHOD OF WIRING A HEAD SUSPENSION ASSEMBLY

BACKGROUND OF THE INVENTION

1. Technical Field

The present invention relates to a wiring method for a head suspension assembly in which a tab frame formed integrally with a suspension is used, and a head suspension assembly stand used in the wiring method, and a flexure assembly, a suspension assembly, and a wiring method for the head suspension assembly.

2. Description of the Related Art

In hard disk drives (HDD), by moving magnetic read and write heads in substantially the radial direction of a rotating magnetic disk, data at any location on the magnetic head is accessed. A head suspension assembly (HSA) is a member which has the magnetic heads and moves over the magnetic disk. The HSA is attached to a shaft having an axis of rotation orthogonal to the recording surface of the magnetic disk through an actuator arm or directly, and rotates on a plane parallel with the recording surface of the magnetic disk. This allows the magnetic read and write heads mounted on the top portion of the HSA to move in substantially the radial direction of the magnetic disk. The HGA typically comprises a suspension assembly, a slider, and a lead assembly.

The slider is provided with the magnetic read and write heads, and a connection pad portion to which the lead wires of these magnetic heads are connected. To the connecting pad portion, a plurality of leads are connected. The plurality of leads connect the magnetic read and write heads and a controller which transmits data between the magnetic heads. The lead assembly binds the leads in an insulated state.

The leads are arranged in the longitudinal direction of the suspension assembly. One end of the leads is electrically connected to the magnetic heads through the connecting pad portion of the slider. The other end of the leads is electrically connected to the controller. Specifically, the one in which the leads are formed of wires and these plurality of wires are insulatively sheathed by a tube of polyurethane resin or the like and collected is called a wire assembly.

In the suspension assembly, a base plate, a load beam and a flexure are integrally constructed. The base plate has an attaching portion which is attached to the actuator arm or the shaft. The load beam is spot welded to the base plate, for instance, in a plurality of positions. The flexure is provided on the top portion of the load beam, and it is bonded to the load beam by a bonding agent or spot welding. The slider is fixed to the flexure.

When the magnetic disk rotates, air enters between the magnetic disk and the slider to form a so-called air bearing. The air bearing allows the slider to rise in proximity of the disk surface. The load beam gives the slider a resilient force (spring force) against the lift (levitation force) of the slider. The flexure gives the slider riding on the air bearing flexibility accommodating the very small recesses and protrusions on the disk surface. This allows the disk and the slider to be close to each other without contacting them, so that the distance between them is kept substantially constant.

A combination of the load beam and the flexure is called a suspension in the sense that the combination elastically supports the slider. An arrangement obtained by adding the base plate or the like to the suspension is called a suspension assembly, and an arrangement obtained by attaching the slider to the suspension assembly and wiring leads is called a head suspension assembly (HSA).

As a method for arranging a plurality of wires on the suspension assembly and connecting the wires and the connecting pads on the slider, a method of assembling HSA using a tab frame formed integrally with the suspension is disclosed, for instance, in the specification of Japanese Published and Unexamined Patent Application No. 9-128726.

A conventional method of assembling HSA's is shown in FIGS. 20 and 21. FIG. 20 is a top view of the top portion of the suspension assembly. Further, FIG. 21 is a side view of the top portion of the suspension assembly shown in FIG. 20; FIG. 21(a) is a side view only of the load beam, FIG. 21(b) is a side view only of the flexure assembly, and FIG. 21(c) a side view of the suspension assembly integrating them.

A suspension assembly 1 is configured by integrally stacking a load beam 10 shown in FIG. 21(a) and a flexure assembly 20 shown in FIG. 21(b). The suspension assembly 1 is supported by first support means, not shown, on which the suspension assembly 1 can be removably mounted. The load beam 10 is formed from sheet-like stainless steel having a thickness of several tens of mm. As shown in FIGS. 20 and 21, the load beam 10 comprises a plane portion 10a which narrows in the width toward the top end thereof, ribs 11 and 12 provided on the side edge portions on both sides of the plane portion 10a, and a merge lip 15 forming the topmost portion of the load beam 10.

The ribs 11 and 12 are provided to ensure the rigidity of the load beam 10. The plane portion 10a is provided with a plurality of holes 16a, 16b, 16c, 16d, 16e, and 16f, which are used to make the load beam 10 lightweight as well as for positioning in the assembling of the HSA. It is required that the HSA should be lightweight and have certain rigidity to perform its rotary motion at high speed. The HSA is exposed to the air flow generated by the rotating disk. This air flow deforms and vibrates the HSA. The load beam 10 is required to have rigidity resisting the deformation force.

Further, in the top portion of the plane portion 10a (rear side of the merge lip 15), there is provided an opening window 13 for connecting four wires 40 to the corresponding bonding pads 51 on a slider 50, respectively. On the central axis (not shown) of the suspension assembly (load beam 10) on the rear side of the opening window 13, there is provided a gimbal pivot 14 extending downwards in the figure.

The flexure assembly 20 is formed from a sheet of stainless steel which is thinner than the load beam 10. As shown in FIGS. 20 and 21, the flexure assembly 20 has a flexure 21 and a tab frame 30, which is configured integrally with the flexure 21. The rear side of the flexure 21 is integrated with the load beam 10 by bonding or spot welding. On the top side of the flexure 21, there is provided a suspension tongue 22 abutting on the gimbal pivot 14 of the load beam 10. The suspension tongue 22 is one-point supported by the gimbal pivot 14 of the load beam 10. A slider 50 is bonded to the suspension tongue 22 in a later step. The slider 50 is one-point supported by the gimbal pivot 14 through the suspension tongue 22, so that it can slightly incline in any direction. The HSA having such gimbal mechanism is particularly called a head gimbal assembly (HGA: Head Gimbal Assembly).

The tab frame 30 is configured by an A-side frame 31, a B-side frame 32, and a C-side frame 33 which are arranged so as to surround the periphery of the top side of the load beam 10. The A-side frame 31 and the B-side frame 32 are connected to the flexure 21. The A-side frame 31 and the B-side frame 32 are provided symmetrically with respect to the central axis of suspension assembly 1, and they are extending in substantially parallel with the central axis of the suspension assembly 1, respectively. The C-side frame 33 is connected to the A-side frame 31 and the B-side frame 32 in the top side of the suspension assembly 1.

The A-side frame 31 is connected to the flexure 21 by its connecting portions 31a and 31b. A cutout hole 31c is provided between the connecting portions 31a and 31b. The A-side frame 31 is connected to the C-side frame 33 by its connecting portions 31d and 31e. A cutout hole 31f is provided between the connecting portions 31d and 31e.

Similarly, the B-side frame 32 is connected to the flexure 21 by its connecting portions 32a and 32b. A cutout hole 32c is provided between the connecting portions 32a and 32b. The B-side frame 32 is connected to the C-side frame 33 by its connecting portions 32d and 32e. A cutout hole 32f is provided between the connecting portions 32d and 32e. These cutout holes 31c, 31f, 32c, and 32f are provided to ease the separation of the tab frame 30 from the flexure 21 in a later step.

The C-side frame 33 crosses the merge lip 15 of the load beam 10, and it comprises a first plane portion 33a to which the A-side frame 31 and the B-side frame 32 are connected, a step portion 33b which forms a step in the right side edge portion of the first plane portion 33a in the drawing, and a second plane portion 33c extending through the step portion 33b to the right of the first plane portion 33a in the drawing. The first plane portion 33a is provided so as to be substantially coplanar with the plane portion 10a of the load beam 10. On the other hand, the second plane portion 33c is provided so as to be substantially coplanar with the merge lip 15 of the load beam 10.

The four wires 40 in a tube, not shown, are attached to the rear side of the suspension assembly 1. Each wire 40 is fixed on a predetermined location on the load beam 10 by a bonding agent 41, while being led from the rear side to the top side of the suspension assembly 1. At the rear side of the load beam 10, not shown, the four wires 40 are divided into two on both sides of the load beam 10, two wires for each side, and led to the top side of the load beam 10. The wires 40 divided for both sides further cross the opening window 13 of the load beam 10, intersect each other on the merge lip 15, are led to a predetermined location on the second plane portion 33c of the C-side frame 33, and fixed by a bonding agent.

The slider 50 is vertically raised in the drawing, as shown is FIG. 21(c), and arranged so that part of it passes through the opening window 13 of the load beam 10. The slider 50 is supported by second support means, not shown, for removably mounting the slider 50. On the upper surface of the slider 50, four bonding pads 51 are placed in parallel, as shown in FIG. 20.

When each of the four wires 40 is bonded to a predetermined location on the second plane portion 33c of the C-side frame 33, it is positioned so as to be put in contact with or close to the corresponding bonding pad 51 on the slider 50. Each wire is connected to each bonding pad 51 by ultrasonic welding, as known well.

When each wire 40 is connected to each bonding pad 51 on the slider 50, the tab frame 30 completes its role to position the four wires 40, and thus, the four wires 40 are cut off at the top portion of the bonding pads 51 and the tab frame 30 is disconnected from the flexure 21. The slider 50 is rotated in the direction of arrow A shown in FIG. 21(c), and bonded to the suspension tongue 22 of the flexure 21. The four wires 40 connected to the respective bonding pads 51 on the slider 50 are bent downwards in unison with the bonding pads 51 as the slider 50 rotates.

Problems to be Solved by the Invention

In the HDD apparatus, a larger capacity of storage and the speedup of the data access are desired, and the reduction of the distance between a plurality of disks, the increase in the rotational speed of magnetic disks, and the achievement of a higher-density recording are attempted. If the distance between a plurality of disks is shortened, and if the rotational speed of magnetic disks is increased, the velocity of the air flow generated by a rotating disk becomes faster. This air flow causes the head suspension assembly (HSA) to vibrate, thereby reducing reliability for the magnetic head to access data on the magnetic disk. Thus, it needs to decrease the air resistance of the HSA to reduce the vibration of the HSA due to the air flow. To decrease the air resistance of the HSA, it is effective to decrease the area of the side of the HSA exposed to the air flow and decease the width of the HSA in the top side thereof.

However, in the above described conventional HAS, there was a problem that, since an opening window is provided in the top side of the load beam to connect a plurality of wires to the bonding pads on the slider, the width of the HSA in the top side thereof cannot be made small. Further, in the conventional HSA, the margins provided on both side edge portions of the plane portion of the load beam are bent substantially perpendicularly to form a rib. There was a problem that, since this rib has a function of ensuring the rigidity of the HSA while it increases the area receiving the air flow, it causes the HSA to vibrate.

The present invention was made to solve such problems, and its object is to provide a wiring method for HSA in which the width of the HSA in the top side thereof can be further decreased by connecting a plurality of wires to the connecting pads on the slider, without providing any opening window in the top side of the load beam, an assembly stand for HSA, a flexure assembly, a suspension assembly, and a wiring method for the HSA.

SUMMARY OF THE INVENTION

The first wiring method for head suspension assembly related to this invention comprises: a first fixing step for fixing a tube on a predetermined location on a suspension assembly, the tube binding a plurality of wires for electrically connecting the magnetic head of a disk storage device and a controller which transmits data between the magnetic head, the suspension assembly having a suspension to which a slider having the magnetic head provided thereon is attached, and a tab frame formed integrally with the suspension, the tab frame being coplanar with the peripheral suspension of the top side of the suspension; a second fixing step for fixing a plurality of wires extending from the fixed tube on predetermined locations on the suspension, while leading the wires to the top side of the suspension; a third fixing step for fixing each wire led to the top side of the suspension on each predetermined location on the tab frame, the third fixing step including a wire bending step for bending each wire led to the top side of the suspension, and leading it to each predetermined location on the tab frame.

Further, the head suspension assembly stand related to this invention is a head suspension assembly stand in which a suspension assembly is attached to a predetermined location for wiring, on the suspension assembly, a plurality of wires for electrically connecting the magnetic head of a disk storage device and a controller which transmits data between the magnetic head, the head suspension assembly stand comprising a plurality of firs pins which each wire led from the rear side to the top side of the suspension assembly is wound around while being fixed on a predetermined location on the suspension assembly, each wound wire being bent in a beveled direction with respect to the longitudinal central axis of the suspension assembly so as to be substantially coplanar with the suspension assembly.

Further, the flexure assembly related to this invention comprising: a flexure partially forming a suspension for elastically supporting a slider, on which the magnetic head of a disk storage device is provided; and a tab frame formed integrally with the flexure so that the tab frame and the peripheral suspension on the top side of the suspension are substantially coplanar, the tab frame having bonding portions to which a plurality of wires are each bonded for electrically connecting the magnetic head and a controller which transmits data between the magnetic head, the tab frame having: a first frame integrally connected to the flexure, the first frame being bendable substantially perpendicularly with respect to the flexure; and a second frame including the bonding portions, integrally connected to the first frame, and a bendable substantially perpendicularly with respect to the first frame, wherein the first frame and the second frame are configured so that, when, at first, the first frame is bent substantially perpendicularly with respect to the tab frame, and then, the second frame is bent substantially perpendicularly with respect to the first frame, the plurality of wires bonded to the bonding portions are positioned at the bondable locations for the respective connecting pads on the slider.

Further, the suspension assembly related to this invention comprises: a suspension for elastically supporting a slider on which the magnetic head of disk storage device is provided; and a tab frame formed integrally with the suspension so that the tab frame and the peripheral suspension of the top side of the suspension are substantially coplanar, the tab frame having bonding portions to which a plurality of wires are each bonded for electrically connecting the magnetic head and a controller which transmits data between the magnetic head, the tab frame having: a first frame integrally connected to the suspension, the first frame being bendable substantially perpendicularly with respect to the suspension; and a second frame including the bonding portions, integrally connected to the first frame, and bendable substantially perpendicularly with respect to the first frame, wherein the first frame and the second frame are configured so that, when, at first, the first frame is bent substantially perpendicularly with respect to the suspension, and then, the second frame is bent substantially perpendicularly with respect to the first frame, the plurality of wires bonded to the bonding portions are positioned at the bondable locations for the respective connecting pads on the slider.

Further, the second wiring method for head suspension assembly comprises: a step for preparing a suspension assembly comprising a suspension for elastically supporting a slider on which the magnetic head of a disk storage device is provided, and a tab frame formed integrally with the suspension so that the tab frame and the peripheral suspension of the top side of the suspension are substantially coplanar, the tab frame having bonding portions to which a plurality of wires are each bonded for electrically connecting the magnetic head and a controller which transmits data between the magnetic head, the tab frame having a first frame integrally connected to the suspension and bendable substantially perpendicularly with respect to the suspension, and a second frame including the bonding portions, integrally connected to the first frame, and bendable substantially perpendicularly with respect to the first frame; a first fixing step for fixing a tube binding the plurality of wires on a predetermined location on the suspension assembly; a second fixing step for fixing the plurality of wires extending from the fixed tube on a predetermined location on the suspension, while leading them to the top side of the suspension, to which the slider on which the magnetic head is provided is attached; a third fixing step for bonding each wire led to the top side of the suspension to the bonding portion of the second frame of the tab frame; an insulation film removing step for removing the insulation film of each connecting portion of the plurality of wires to connect the plurality of wires to the respective connecting pads; a first frame bending step for bending the first frame substantially perpendicularly with respect to the suspension; a second frame bending step for bending the second frame substantially perpendicularly with respect to the first frame, thereby to position the connecting portion of the plurality of wires bonded to the bonding portions of the second frame at the bondable locations for the respective connecting pads on the slider; and an ultrasonic welding step for ultrasonic-welding the respective connecting portions of the plurality of wires to the respective connecting pads on the slider.

BRIEF DESCRIPTION OF THE DRAWINGS

The preferred embodiments of the head suspension assembly (HSA) related to the present invention and the wiring method therefore will be described with reference to the following drawings.

DETAILED DESCRIPTION OF THE PREFERRED EMBODIMENT

Figure 1:
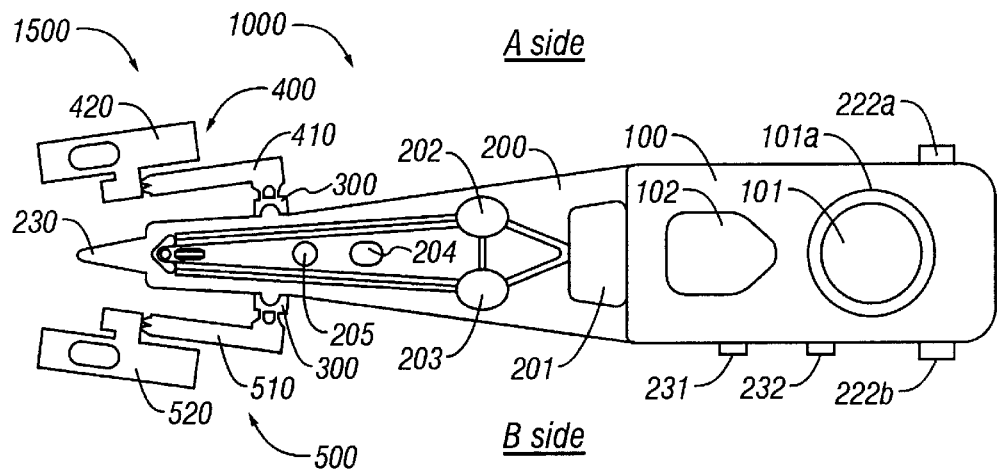
FIG. 1 is a front view of the suspension assembly related to this invention.
Figure 2:
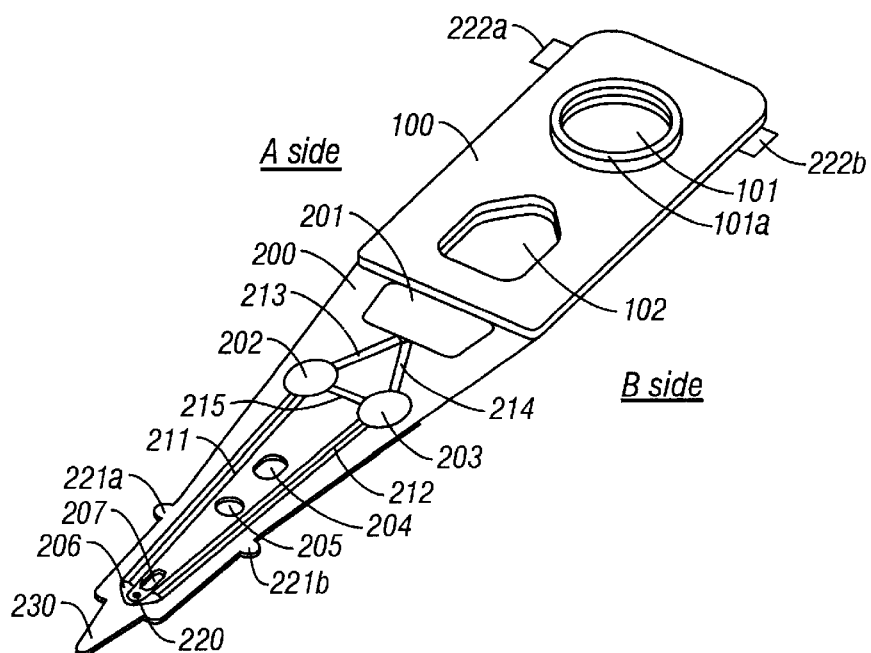
FIG. 2 is a perspective view of the base plate and the load beam which are partially forming the suspension assembly shown in FIG. 1.
Figure 3:
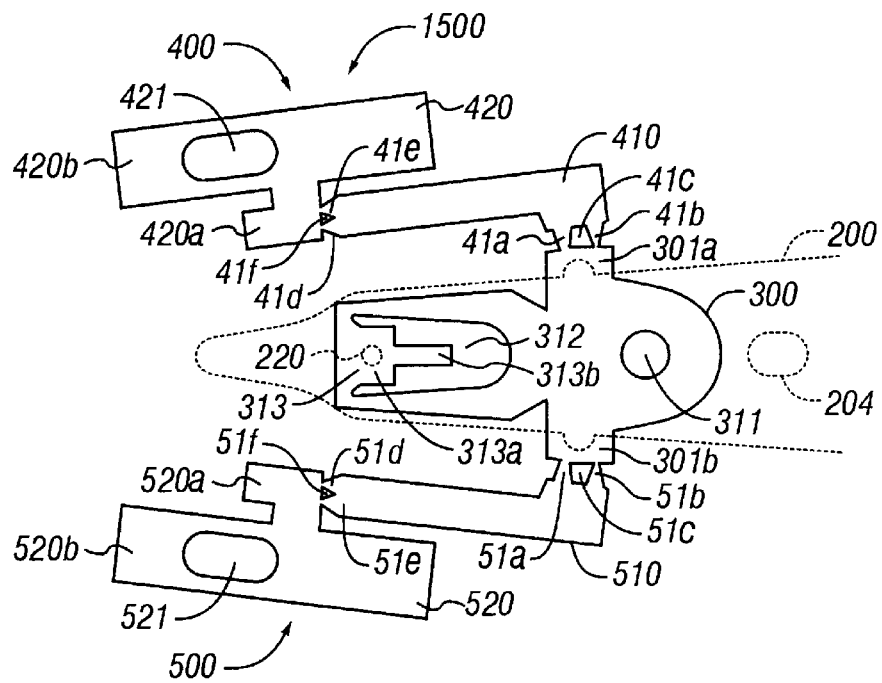
FIG. 3 is a front view of the flexure assembly partially forming the suspension assembly shown in FIG. 1.

FIG. 1 is a top view of the suspension assembly related to the present invention. And, FIG. 2 is a perspective view of the base plate and the load beam which are partially forming the suspension assembly shown in FIG. 1, and FIG. 3 is a top view of the flexure assembly partially forming the suspension assembly shown in FIG. 1.

In FIG. 1, the upper side of the central axis (not shown) of a suspension assembly 1000 is called the A side, and the lower side thereof is called the B side. Further, in FIG. 1, the left side is called the top side, and the right side is called the rear side. In other drawings, these expressions are also used.

As shown in FIG. 1, the suspension assembly 1000 is configured by integrally stacking a base plate 100, a load beam 200, and a flexure assembly 1500. The suspension assembly 1000 is formed substantially symmetrically about its central axis, not shown.

The load beam 200 is formed from stainless steel having a thickness of about 0.05 mm. As shown in FIGS. 1 and 2, the rear side of the load beam 200 is formed substantially rectangularly, and the top side of the load beam 200 is formed so that its width decreases toward the top side.

On the upper surface of the substantially rectangular portion of the rear side of the load beam 200, the base plate 100 having substantially the same outer shape as the load beam 200 is stacked. The base plate 100 is formed from stainless steel having a thickness of about 0.2 mm (except for the portion of a boss 101a). The base plate 100 and the load beam 200 are integrated, for instance, by spot welding in a plurality of portions.

On the rear side of the portion in which the base plate 100 and the load beam 200 are stacked, an attaching hole 101 forming an attaching portion which is attached to an actuator arm or a shaft. A reinforcing boss 101a is provided on the circumference of the attaching hole 101 of the base plate 100.

Further, in this portion, there is provided a hole 102 of a substantially pentagonal shape which makes the HSA lightweight and is used in the assembling of the HSA. On the side edge portion of the B side of the hole 102 of the load beam 200, there is provided a caulking portion 231 for caulking a tube 700 binding a plurality of wires (FIG. 10) to fix them.

On the top side of the load beam 200, there are provided a plurality of holes 201–205 which make the HSA lightweight and are used in the assembling of the HSA. On the rear side of the merge lip 230 forming the topmost portion of the load beam 200, a substantially V-like hole 206 is provided, and in the portion of a nearly half-round shape extending inwardly thereof, there is provided a gimbal pivot 220 extending downwardly. Further, an elongated hole 207 is provided on the rear side of the gimbal pivot 220.

The rigidity of the load beam 200 is weak in the portion where the hole 201 is provided. Both sides of the hole 201 form a hinge portion. The top side of the load beam 200 flexes and deforms with the hinge portion being the boundary. The hinge portion gives a resilient force (spring force) resisting the lift (levitation force) of the slider provided in the top end of the HSA.

Between one end of the substantially V-shaped hole 206 and the hole 202, a restrictor 211 is formed substantially along the side edge portion of the load beam 200 on the A side, and between the other end of a substantially V-shaped hole 207 and the hole 203, a restrictor 212 is formed substantially along the side edge portion of the load beam 200 on the B side. Further, between the hole 202 and the hole 201, and between the hole 203 and the hole 201, restrictors 213 and 214 forming a V-letter are formed, and between the hole 202 and the hole 203, a restrictor 215 is formed. These restrictors 211–215 are provided to secure the rigidity necessary for the load beam 200.

Figure 20:
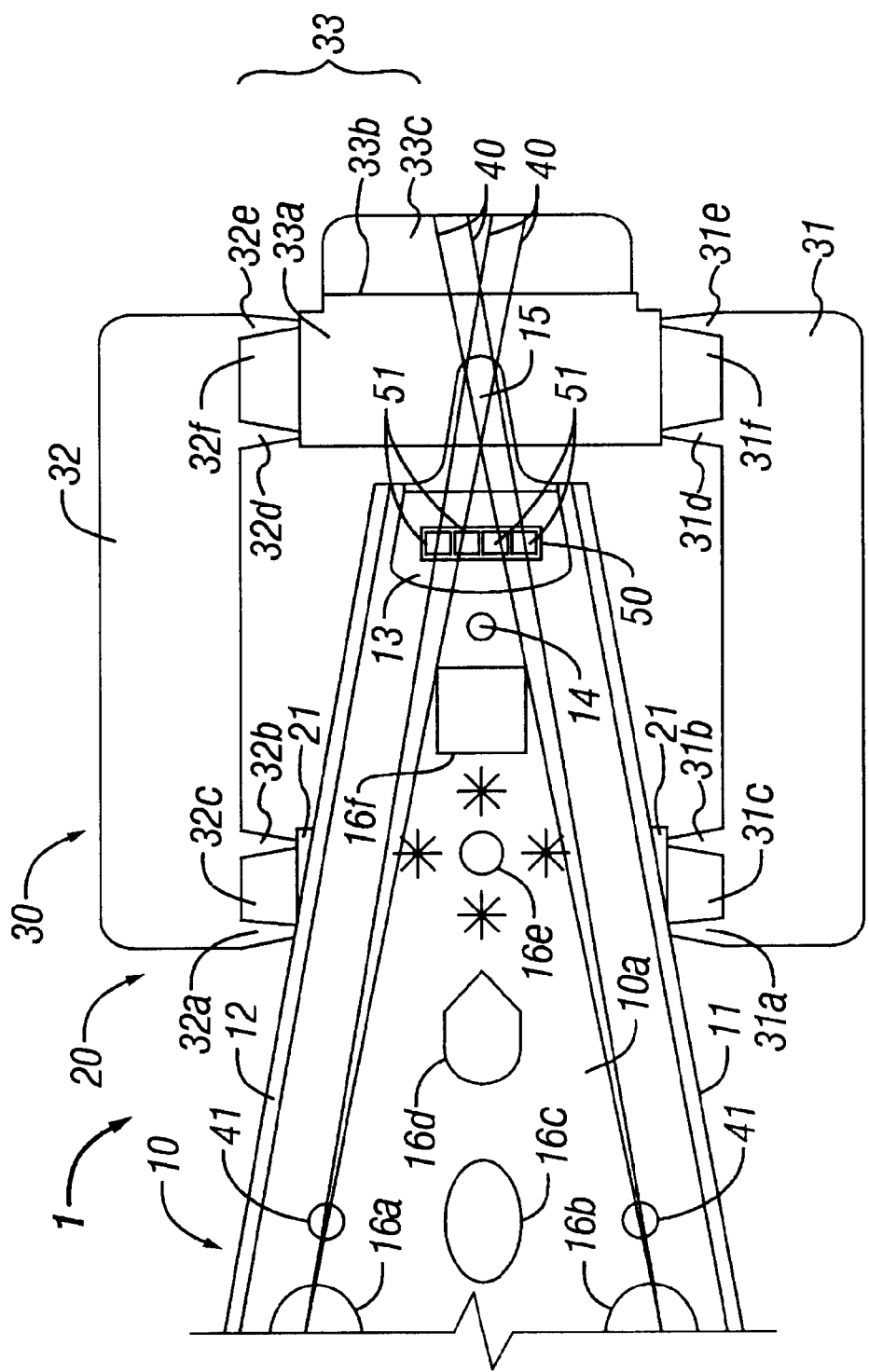
FIG. 20 is a figure showing a prior art assembly method for a conventional HSA, and which is a top view of the top end portion of the suspension assembly.
Figure 21A:
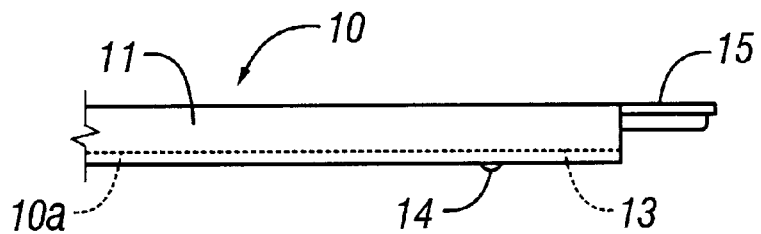
FIGS. 21(a)–(c) are figures showing the prior art assembly method for the conventional HSA, and which is a side view of the top end portion of the suspension assembly shown in FIG. 20.
Figure 21B:
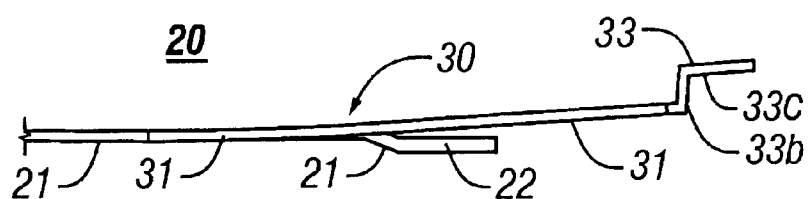
Figure 21C:
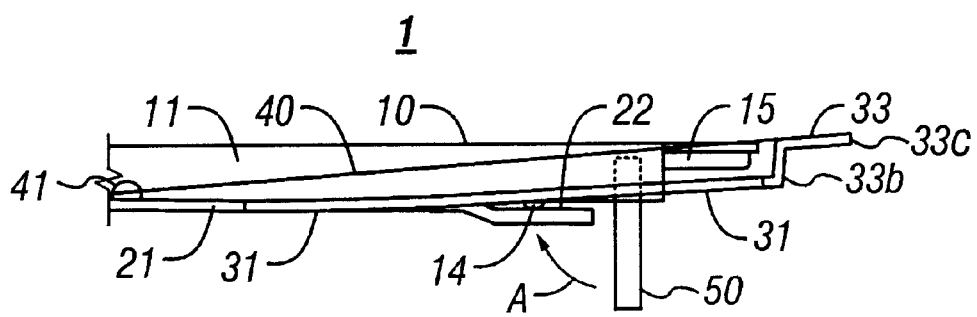

In the conventional HSA shown in FIGS. 20 and 21, the ribs 11 and 12 substantially perpendicular to the plane portion are provided on both side edge portions of the load beam. These ribs 11 and 12 are exposed to an air flow due to the disk rotation. This increases the air resistance of the HSA to vibrate the HSA.

On the other hand, in the load beam 200 of this embodiment, the restrictors 211–215 are formed in the plane portion on the central axis side from both side edge portions of the load beam. These restrictors 211–215 can be formed so that the depths of these restrictors are kept to be low to provide a smooth slope. For this, the areas on both sides of the HSA can be made small. Further, since the distances between the restrictors 211 and 212 and the central axis of the load beam 200 respectively become shorter, the deformation amount by the air flow can be made small. Accordingly, the air resistance of the HSA can be decreased, and the vibration of the HSA can be decreased.

As shown in FIG. 1, on the underside of the top side of the load beam 200, there is provided a flexure assembly 1500. The flexure assembly 1500 is formed from stainless steel having a thickness of the order of 0.02 mm. As shown in FIG. 3, the flexure assembly 1500 comprises a flexure 300 connected to the load beam 200, and an A-side tab frame 400 and a B-side tab frame 500 which are formed integrally with the flexure 300.

The flexure 300 is formed in superposed relation with the load beam 200 shown by a dotted line in FIG. 3, except for projecting portions 301a and 301b. The rear side of the flexure 300 is integrated with the load beam 200 by bonding or spot welding. In the rear side of the flexure 300, a hole 311 having the same diameter as the hole 205 of the load beam 200 is provided. The holes 205 and 311 are used for positioning when the flexure is coupled with the load beam 200.

In the top side of the flexure 300, an opening 312 is formed. On the top side of the opening 312, there is provided a suspension tongue 313 so as to extend from the top side of the opening 312 to the central portion thereof. The suspension tongue 313 is made up of a square-shaped principal plane portion 313a and an elongated extending portion 313b which extends to the rear side thereof. Upon the central portion of the principal plane portion 313a of the suspension tongue 313, the gimbal pivot 220 of the load beam 200 is abutting. The portions on both sides of the opening 312 form a curved portion. The curved portion warps to cause the suspension tongue 313 to abut against the gimbal pivot 220 of the load beam 200. The suspension tongue 313 is one-point supported by the gimbal pivot 220.

The A-side tab frame 400 and the B-side tab frame 500 are symmetrically provided about the central axis of the flexure 300 (suspension assembly 1000), and they are respectively extending substantially parallel with the central axis of the suspension assembly 1000.

The A-side tab frame 400 comprises a first frame 410 connected to the flexure 300, and a second frame 420 connected to the first frame 410. The first frame 410 extends substantially along the A-side edge portion of the load beam 200, and it is connected to the projecting portion 301a of the flexure 300 by a connecting portion 41a and a connecting portion 41b, which are provided on the sides of the rear end thereof. Between the connecting portions 41a and 41b, a cutout hole 41c, the first frame 410 is connected to the flexure 300 at two points.

Further, the first frame 410 is connected to the second frame 420 by a connecting portion 41d and a connecting portion 41e which are provided on the top side thereof. Between the connecting portions 41d and 41e, cutout hole 41f is formed. By the formation of the cutout hole 41f, the first frame 410 and the second frame 420 are connected each other at two points.

The cutout hole 41c is provided to bend the first frame 410 substantially perpendicularly with respect to the flexure 300, and to ease the separation of the first frame 410 from the flexure 300 in later steps. Further, the cutout hole 41f is provided to easily bend the second frame 420 substantially perpendicularly with respect to the first frame 410.

The second frame 420 comprises a plane portion 420a provided as if the first frame 410 lying along the A-side edge portion of the load beam 200 is extended to the top side thereof, and a plane portion 420b extending in parallel with the first frame 410 and lying outside the plane portion 420a on the top and rear sides of the plane portion 420a. In the top side of the plane portion 420b, an elongated hole 421 is provided. To the top side of the plane portion 420a, two wires are bonded when the HSA is assembled.

As described above, the B-side tab frame 500 is formed symmetrically with the A-side tab frame 400 about the central axis of the suspension assembly 1000. The B-side tab frame 500 has a first frame 510 connected to the flexure 300, and a second frame 520 connected to the first frame 510. The first frame 510 extends substantially along the B-side edge portion of the load beam 200, and it is connected to the projecting portion 301b of the flexure 300 by a connecting portion 51a and a connecting portion 51b which are provided on the rear side face. Between the connection portions 51a and 51b, a cutout hole 51c is formed, and the first frame 510 is connected to the flexure 300 at two points.

Further, the first frame 510 is connected to the second frame 520 by a connecting portion 51d and a connecting portion 51e which are provided on the top side thereof. Between the connecting portions 51d and 51e, a cutout hole 51f is formed, and the first frame 510 and the second frame 520 are connected each other at two points.

The second frame 520 has a plane portion 520a provided as if the first frame 510 lying substantially along the B-side edge portion of the load beam 200 is extended to the top side thereof, and a plane portion 520b extending in parallel with the first frame 510 and lying outside the plane portion 520a on the top and rear sides of the plane portion 520a. In the top side of the plane portion 520b, an elongated hole 521 is provided. To the top side of the plane portion 520a, two wires are bonded when the HSA is assembled.

Figure 4:
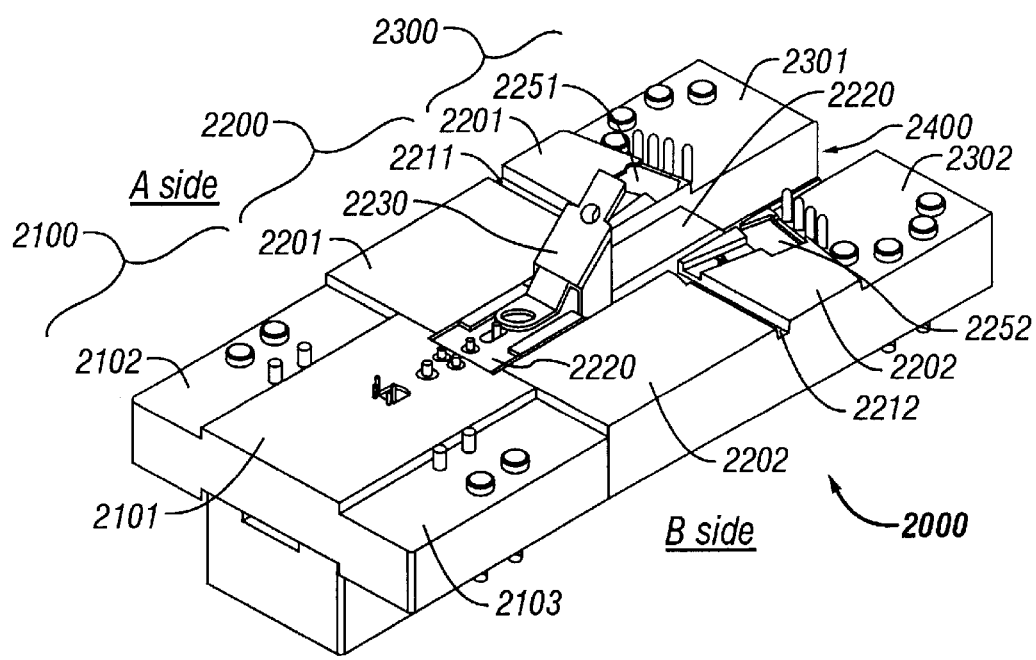
FIG. 4 is a perspective view of the HSA assembly stand related to this invention.
Figure 5:
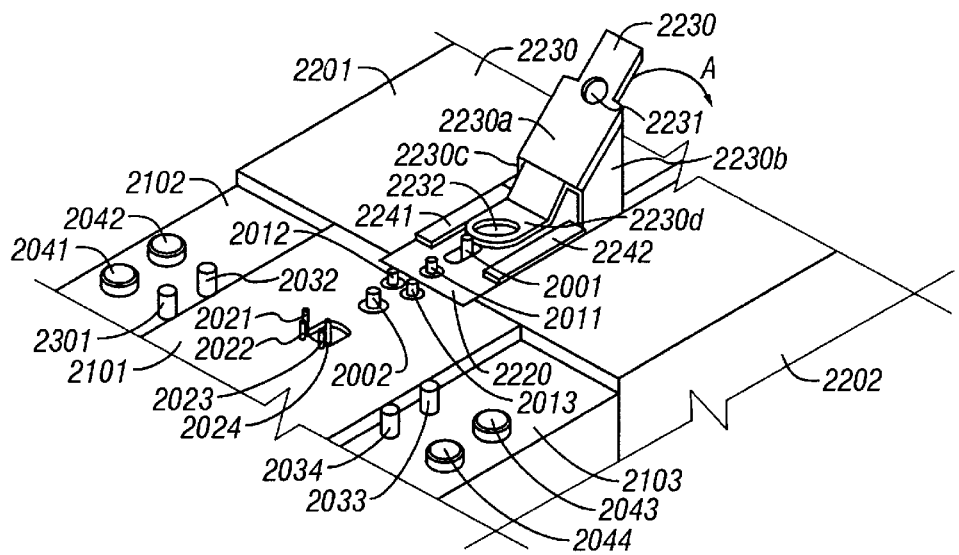
FIG. 5 is a partially enlarged view of the HSA assembly stand shown in FIG. 4.

FIG. 4 is a perspective view of the HSA assembly stand related to this invention, and FIG. 5 is a partially enlarged view of it. Further, FIG. 6 is a top view of the HSA assembly stand on which a suspension assembly is mounted.

This HSA assembly stand 2000 is used to arrange a plurality of wires on the suspension assembly 1000. The HSA assembly stand 2000 (the main body and the respective members described below) is formed from stainless steel.

Figure 6:
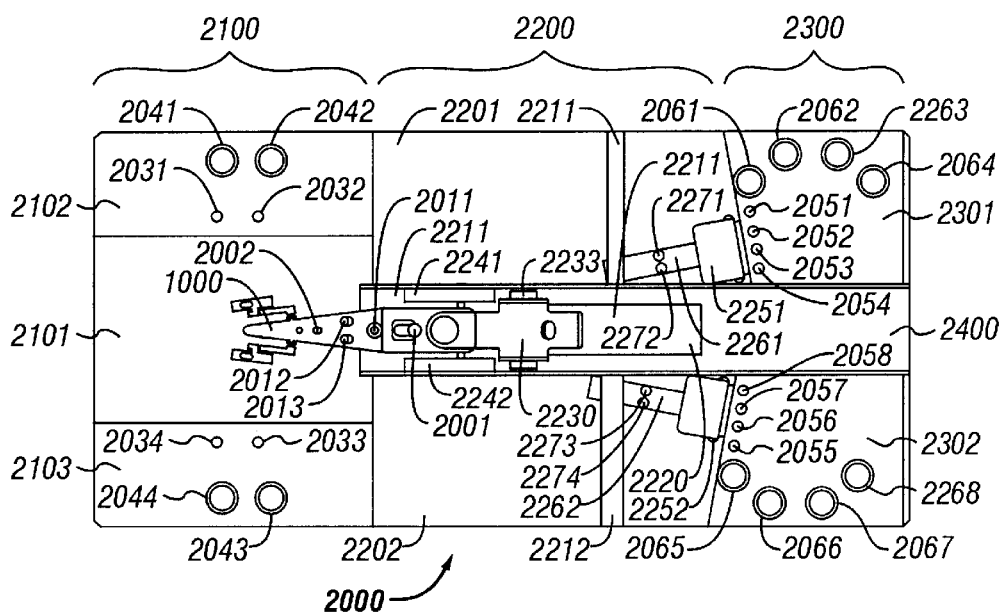
FIG. 6 is a top view of the HSA assembly stand on which the suspension assembly is mounted.

In FIG. 6, the upper side of a central section (not shown) extending in the longitudinal direction of the HSA assembly stand 2000 is called an A side, and the lower side thereof is called a B side. Further, in FIG. 6, the left side is called a top side, and the right side is called a rear side. These expressions are also used in other figures.

As shown in FIGS. 4 to 6, the HSA assembly stand 2000 is configured symmetrically about the central section (not shown) extending in the longitudinal direction thereof. The HSA assembly stand 2000 has a wire top end arranging portion 2100, a suspension assembly (SA: Suspension Assembly) mounting portion 2200, and a wire terminal arranging portion 2300. In the central portions of the SA mounting portion 2200 and the wire terminal arranging portion 2300, a longitudinal groove portion 2400 is provided.

In the groove portion 2400 of the SA mounting portion 2200, there is provided an SA damper attaching stand 2220 to which an SA damper 2230 is attached. On both sides of the groove portion 2400 of the SA mounting portion 2200, there are provided an A-side upper surface portion 2201 in which a groove 2211 is formed, and a B-side upper surface portion 2202 in which a groove 2212 is formed. The upper surface of the SA damper attaching stand 2220, the A-side upper surface portion 2201, and the B-side upper surface portion 2202 are at the same level.

The SA damper 2230 removably mounts the suspension assembly 1000. As shown in FIG. 5, the SA damper 2230 comprises a slope portion 2230a in which a hole 2231 is provided, a pressing portion 2230d provided at one end of the slope portion 2230a, and side portions 2230b and 2230c provided on both sides of the slope portion 2230a. In the pressing portion 2230d there is provided a hole 2232 into which the boss 101a provided in the base plate 100 of the suspension assembly 1000 is fitted.

The side portions 2230b and 2230c of the SA damper 2230 are supported on the SA damper attaching stand 2220 by a shaft member 2233 shown in FIG. 6. The SA damper 2230 can rotate as if it falls down in the direction shown by an arrow A in FIG. 5 around the central axis of the shaft member 2233, and it is actuated by actuator means such as a spring, not shown, in the direction (opposite to the arrow A) in which it rises.

On the side edge portions of the SA damper attaching stand 2220, which are on both sides of the pressing portion 2230d of the SA damper 2230, there are provided guide portions 2241 and 2242 which are projecting from the top surface of the SA damper attaching stand 2220.

The wire top end arranging portion 2100 has a central upper surface portion 2101, an A-side upper surface portion 2102, and B-side upper surface portion 2103.

The central upper surface portion 2101 is at the same level as the A-side upper surface portion 2201 and the B-side upper surface portion 2202 of the SA mounting portion 2200. The A-side upper surface portion 2102 and the B-side upper surface portion 2103, which are provided on both sides of the central upper surface portion 2101, are at a position lower than the central upper surface portion 2101 by about several millimeters.

As shown in FIG. 5, on the upper surface of the SA clamper attaching stand 2220 and the central upper surface portion 2102 which are nearer to the top side than the SA damper 2230, there are arranged a suspension positioning pin 2001, a wire positioning pin 2011, wire positioning pins 2012 and 2013, a suspension positioning pin 2002, and wire positioning pins 2021–2024.

When the suspension assembly 1000 is mounted on the HSA assembly stand 2000, the SA damper 2230 is fallen in the direction of A in FIG. 5. The rear side of the suspension assembly 1000 is guided between the guide portions 2241 and 2242 of the SA damper attaching stand 2220, and inserted between the SA damper attaching stand 2220 and the pressing portion 2230d of the SA clamper 2230.

Then, the SA damper 2230 is returned to the direction opposite to the arrow A, and the hole 2232 of the SA damper 2230 is fitted over the boss 101a of the suspension assembly 1000. This allows the rear side of the suspension assembly 1000 to be pinched by the pressing portion 2230d and a spacer 2243, and fixed.

By this, the elongated hole 204 of the suspension assembly 1000 is fitted over the suspension positioning pin 2002, and the substantially pentagonal hole 102 of the suspension assembly 1000 is fitted over the suspension positioning pin 2001. The top side of the elongated hole 204 abuts on the suspension positioning pin 2002, and the rear side of the hole 102 abuts on the suspension positioning pin 2001. This allows the suspension assembly 1000 to be positioned on the HSA assembly stand 2000.

The wire positioning pin 2011 is located in the central portion of the hole 201 of the suspension assembly 1000, and the wire positioning pins 2012 and 2013 are located in the central portions of the holes 202 and 203 of the suspension assembly 1000, respectively.

The wire positioning pins 2021 and 2022 are arranged to be located between the merge lip 230 of the suspension assembly 1000 mounted on the HSA assembly stand 2000 by the SA damper 2230 and the plane portion 420a of the second frame 420 of the A-side tab frame 400. The wire positioning pin 2022 is arranged on the top side of the wire positioning pin 2021.

The wire positioning pins 2023 and 2024 are arranged to be located between the merge lip 230 of the suspension assembly 1000 and the plane portion 520a of the second frame 520 of the B-side tab frame 500. The wire positioning pin 2023 is arranged on the top side of the wire positioning pin 2024.

Figure 8:
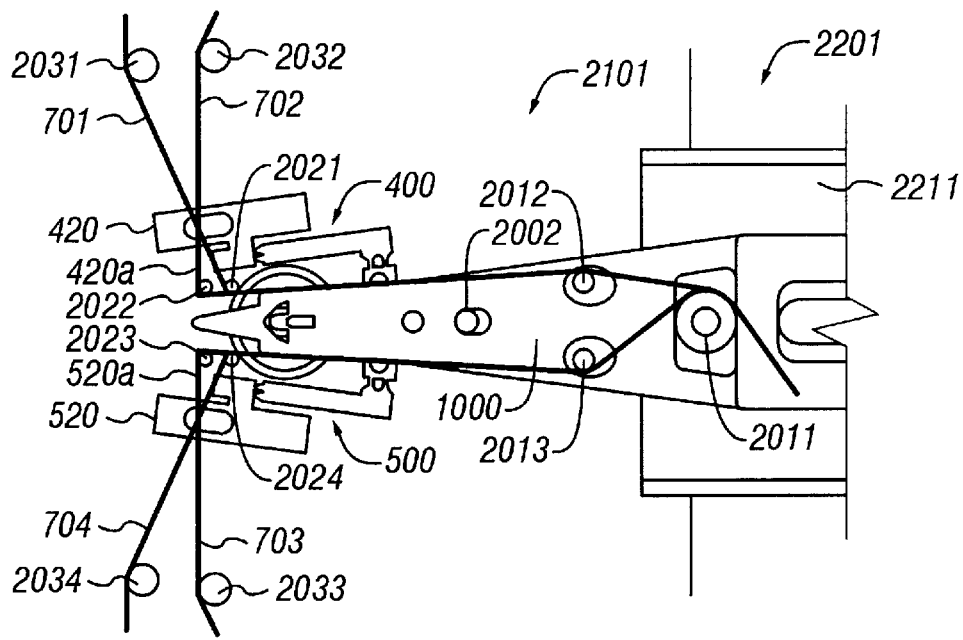
FIG. 8 is a figure showing a method for arranging wires on the suspension assembly.

The wire positioning pins 2021–2024 are formed by a pin having a diameter of 0.2 mm. As described later, on the suspension assembly 1000, four wires 701–704 are arranged (FIG. 8). The wire 701 is wound around the wire positioning pin 2021, and the wire 702 is wound around the wire positioning pin 2022. The wire 703 is wound around the wire positioning pin 2023, and the wire 704 is wound around the wire positioning pin 2024.

On the A-side upper surface portion 2102, there are provided a wire positioning pin 2031, a wire positioning pin 2032, a wire clamper 2041, and a wire damper 2042. The wire positioning pin 2032 is placed on the rear side of the wire positioning pin 2031. The distance between the wire positioning pin 2031 and the wire positioning pin 2032 is set so that it is larger than the distance between the wire positioning pin 2021 and the wire positioning pin 2022. The wire damper 2042 is placed on the rear side of the wire damper 2041.

On the B-side upper surface portion 2103, there are provided a wire positioning pin 2033, a wire positioning pin 2034, a wire damper 2043, and a wire damper 2044. The wire positioning pin 2033 is placed on the rear side of the wire positioning pin 2034. The distance between the wire positioning pin 2033 and the wire positioning pin 2034 is set so that it is larger than the distance between the wire positioning pin 2033 and the wire positioning pin 2034. The wire damper 2043 is placed on the rear side of the wire damper 2044.

The wire positioning pins 2031–2034 are formed by a pin having a diameter of 1.0 mm. The wire 701 is wound around the wire positioning pin 2031, and the wire 702 is wound around the wire positioning pin 2032. The wire 703 is wound around the wire positioning pin 2023, and the wire 704 is wound around the wire positioning pin 2024.

The wire cdampers 2041–2044 form fixing means for temporarily fixing the respective wires 701–704 onto the HSA assembly stand 2000. The configuration of the wire clampers 2041–2044 is shown in FIG. 7.

Figure 7A:
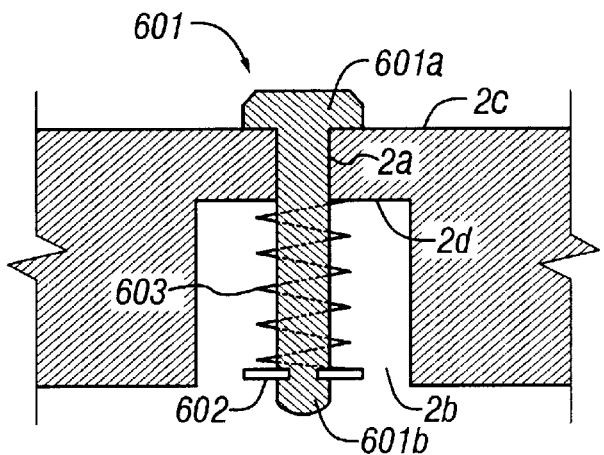
FIG. 7 is a cross-sectional view showing the configuration of the wire camper shown in FIG. 4.

In the HSA assembly stand 2000, there are holes 2a and 2b provided in two stages, as shown in FIG. 7(a). The wire clampers 2041–2044 are formed by inserting a pin 601 having a head 601a into the hole 2a, attaching a spring 603 to the pin 601 from the lower top side of the pin 601, and attaching a ring-shaped stopper 602 on the top side of the pin 601.

The pin 601 is supported on the upper surface 2c of the main body of the HSA assembly stand 2000 by its head 601a. The spring 603 is defined for its upper end position by the underside 2d formed by providing the hole 2b. The stopper 602 is actuated downwards by the spring 603. The pin 601 is supported on the upper surface 2c of the main body while downwardly actuated by the spring 603 through the stopper 602. Under the pin 601, there is provided lift means, not shown, which abuts on the top end portion 601b of the pin 601, and raises and lowers the pin 601 against the actuation force of the spring 603. The lift means is configured by an air cylinder. The pin 601 is slidably moved up and down in the hole 2a by the lift means.

Figure 7B:
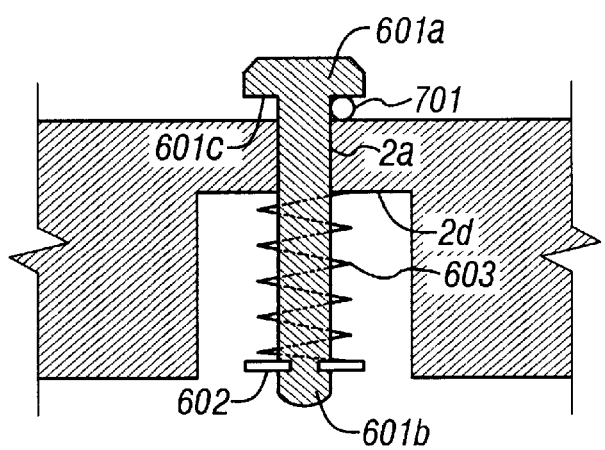

The pin 601 is moved upwards by the above-mentioned lift means against the actuation force of the spring 603, and around the side of the pin 601 between the upper surface 2c of the HSA assembly stand 2000 and the underside 601c of the head 601a of the pin 601, for instance, the wire is 701 wound. When the pin 601 is moved downwards by the above-mentioned lift means, the wire 701 is pinched and fixed between the upper surface 2c of the HSA assembly stand 2000 and the underside 601c of the head 601a of the pin 601 by the actuation force of the spring 603, as shown in FIG. 7(b).

Figure 7C:
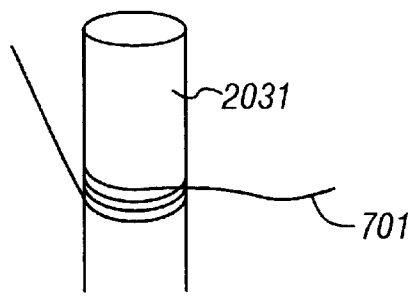

As shown in FIG. 7(c), it is also possible to fix the wire 701 by repeatedly winding it around the wire positioning pin 2031 provided on the HSA assembly stand 2000. However, it is cumbersome and time-consuming to repeatedly wind the fine wire 701 around the thin pin 2031. Further, this work can damage the wire 701 or the like which are already arranged on the suspension assembly 1000.

On the other hand, if the wire clampers 2041–2044 are used, it is only needed to raise and lower the pin 601 by lift means, not shown, and wind the wire 701 around it. This is an easy work. Further, by causing the pin 601 to rise again with the lift means, not shown, the wire 701 fixed by the wire damper 2041 can be easily removed. Accordingly, the wire can be fixed onto the HSA assembly stand 2000 without damaging the wire 701 or the like which are already arranged on the suspension assembly 1000.

Returning to FIGS. 4 to 6, on the rear side of the A-side upper surface portion 2201 of the SA mounting portion 2200, there is formed a recessed portion 2251 for terminal plate and a recessed portion 2261 for tube. In the recessed portion 2261 for tube, tube positioning pins 2271 and 2272 are provided. Further, on the A-side upper surface portion 2301 of the wire terminal arranging portion 2300, there are provided wire positioning pins 2051–2054 and wire dampers 2061–2064. These are used if the caulking portion for fixing the tube binding a plurality of wires is provided on the A-side edge portion of the suspension assembly.

On the other hand, on the rear side of the B-side upper portion 2202 of the 3A mounting portion 2200, a recessed portion 2252 for terminal plate and a recessed portion 2262 for tube are formed. In the recessed portion 2262 for tube, tube positioning pins 2273 and 2274 are provided. Further, on the B-side upper surface 2302 of the wire terminal arranging portion 2300, there are provided wire positioning pins 2055–2058 and wire dampers 2065–2068. These are used to fix the wires 701–704 extending from the terminal side (rear side) of the tube 700 swaged by the caulking portions 231 and 232 of the suspension assembly 1000, as described later.

Figure 9:
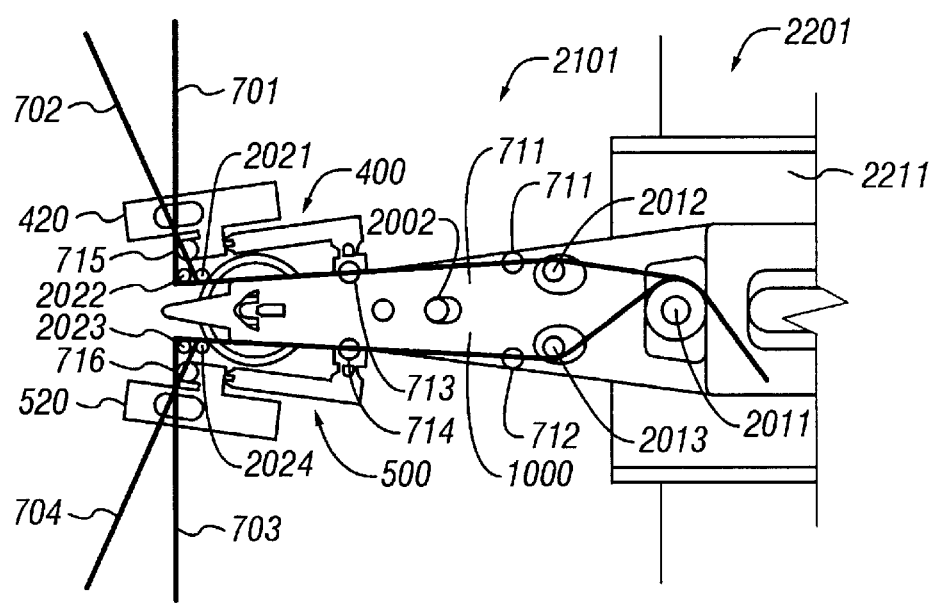
FIG. 9 is a figure showing a method for arranging wires on the suspension assembly.
Figure 10:
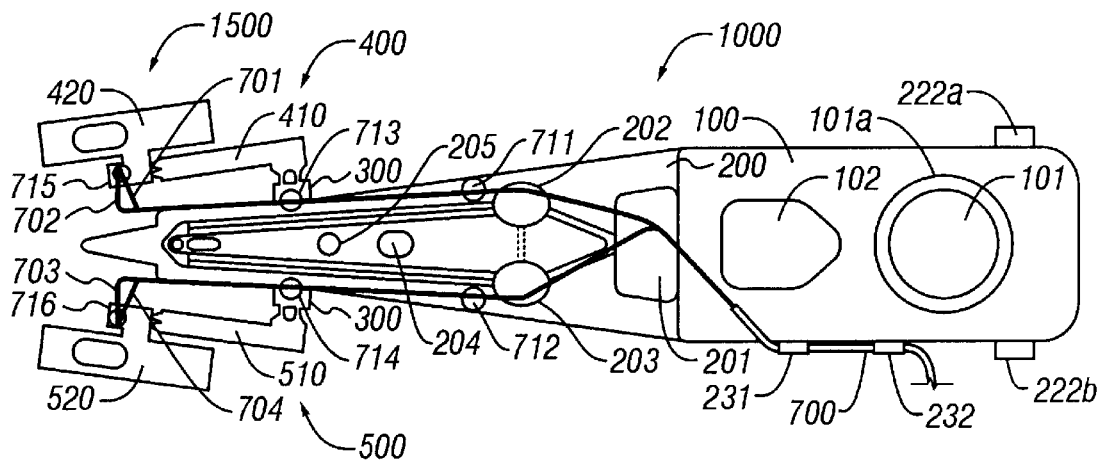
FIG. 10 is a top view of the suspension assembly on which wires are arranged.

FIGS. 8 to 10 show a wiring method in which the suspension assembly 1000 is mounted on the HSA assembly stand 2000, and wires are arranged on the suspension assembly 1000. The wiring method comprises a first fixing step for fixing the tube 700 on the rear side of the suspension assembly, a second fixing step for fixing the wires onto the load beam of the suspension assembly, and a third fixing step for fixing the wires onto the tab frame of the suspension assembly.

In the first fixing step, the tube 700 binding four wires 701–704 is caulked by the caulking portions 231 and 232 of the suspension assembly 1000 and fixed (FIG. 10). When the tube 700 is caulked by the caulking portions 231 and 232 of the suspension assembly 1000 after the wires 701–704 are connected to the connecting pads on the slider, there is a danger of an excessive force being applied in the caulking step to cause any of the wires 701–704 to be pulled and broken. Accordingly, this work is preferably done at the beginning.

In the second fixing step, the four wires 701–704 extending from the tube 700 are wound around the wire positioning pin 2011 of the HSA assembly stand 2000 and divided into two groups, two for each, as shown in FIG. 8. The two wires 701 and 702 of the four wires 701–704 are wound around the A-side wire positioning pin 2012, and led to the top side of the suspension assembly 1000 (load beam 200). These two wires 701 and 702 are bonded onto the load beam 200 by UV (ultraviolet) bonding agents 711 and 713 in a later step, as shown in FIG. 9.

On the other hand, the two wires 703 and 70 of the four wires 701–704 are wound around the B-side wire positioning pin 2013, and led to the top side of the suspension assembly 1000. These two wires 703 and 704 are bonded onto the load beam 200 by UV bonding agents 712 and 714 in a later step, as shown in FIG. 9.

In the third fixing step, the wire 702 is wound around a wire positioning pin 2022, and bent in the direction substantially orthogonal to the central axis of the suspension assembly 1000. The wire 702 is further wound around a wire positioning pin 2032 and bent, and temporarily fixed by the wire damper 2042 shown in FIG. 5. The wire 702 wound around the wire positioning pin 2022 and bent is defined for the bending direction by a wire positioning pin 2032. This allows the wire 702 to be definitely positioned so as to pass by the top side of the plane position 420a of the second frame 420 of the A-side tab frame 400.

The wire 701 is wound around a wire positioning pin 2021, located on the rear side of the wire positioning pin 2022, and bent, and further wound around a wire positioning pin 2031, located on the top side of the wire positioning pin 2032, and bent, and temporarily fixed by the wire damper 2041 shown in FIG. 5. The wire 701 crosses the wire 702 on the plane portion 420a of the second frame 420 of the A-side tab frame 400, reaching the wire positioning pin 2031.

The two wires 701 and 702 are fixed to the top side of the plane portion 420a of the second frame 420 of the A-side tab frame 400 by a UV bonding agent 715, as shown in FIG. 9.

The wire 703 is wound around a wire positioning pin 2023, and bent in the direction substantially orthogonal to the central axis of the suspension assembly 1000. The wire 703 is further wound around a wire positioning pin 2033 and bent, and temporarily fixed by the wire damper 2043 shown in FIG. 5. The wire 703 wound around the wire positioning pin 2023 and bent is defined for its bending direction by the wire positioning pin 2033. This allows the wire 703 to be definitely positioned so as to pass by the top side of the plane portion 520a of the second frame 520 of the B-side tab frame 500.

The wire 704 is wound around a wire positioning pin 2024, located on the rear side of the wire positioning pin 2023, and bent, and further wound around a wire positioning pin 2034, located on the top side of the wire positioning pin 2033, and bent, and temporarily fixed by the wire damper 2044 shown in FIG. 5. The wire 704 crosses the wire 703 on the top side of the plane portion 520a of the second frame 520 of the B-side tab frame 500, reaching the wire positioning pin 2034.

The two wires 703 and 704 are bonded to the top side of the plane portion 520a of the second frame 520 of the B-side tab frame 500 by a UV bonding agent 716 in a later step, as shown in FIG. 9.

After the four wires 701–704 are temporarily fixed to the respective wire dampers 2041–2044, they are bonded to the respective bondable positions on the suspension assembly 1000 by the bonding agents 711–716, as described above.

Thereafter, as shown in FIG. 10, the wires 701 and 702 are cut off in the portion extending beyond the plane portion 420a of the second frame 420 of the A-side tab frame 400, as shown in FIG. 10. The wires 703 and 704 are cut off in the portion extending beyond the plane portion 520a of the second frame 520 of the B-side tab frame 500.

The rear side of the tube 700 swaged by the caulking portions 231 and 232 of the load beam 200 is led to the recessed portion 2262 for tube and positioned between the tube positioning pin 2273 and 2274. On the recessed portion 2252 for terminal plate, there is mounted a terminal plate, not shown, to which the four wires 701–704 extending from the tube 700 are bonded. The terminal plate, not shown, is formed from stainless steel shaped in a sheet.

The wires 701–704 are wound around wire positioning pins 2055–2058 and bent, and temporarily fixed to wire dampers 2065–2068. The wires 701–704 are bonded to the terminal plate by a bonding agent, and cut off in the portion extending beyond the rear side of the terminal plate. The terminal plate is used for testing the HSA alone. When this test is completed, the wires 701–704 are cut in the neighborhood of the terminal plate to separate the terminal plate from the HSA.

When the wires 701–704 are bonded onto the terminal plate by a bonding agent, the suspension assembly 1000 is removed from the HSA assembly stand 2000 along with the terminal plate.

FIGS. 11 to 19 show a wiring method in which the wires 701–704 arranged on the suspension assembly 1000 are connected to bonding pads 811–814. This wiring method comprises an insulation film removing step, a slider bonding step, a first frame bending step, a second frame bending step, an ultrasonic welding step, a tab. frame separation step, and a wire flattening step.

In the insulation film removing step, a laser beam is applied to the respective connecting portions 701a, 702a, 703a, and 704a of the wires 701, 702, 703, and 704 (FIG. 12) to remove the insulation films on the respective connecting portions 701a, 702a, 703a, and 704a. The wires 701–704 have a three-layer structure in which a copper wire is coated with gold, on which an insulation material is further applied. In the insulation film removing step, the outermost insulation film is removed to expose the metal layer.

Figure 11:
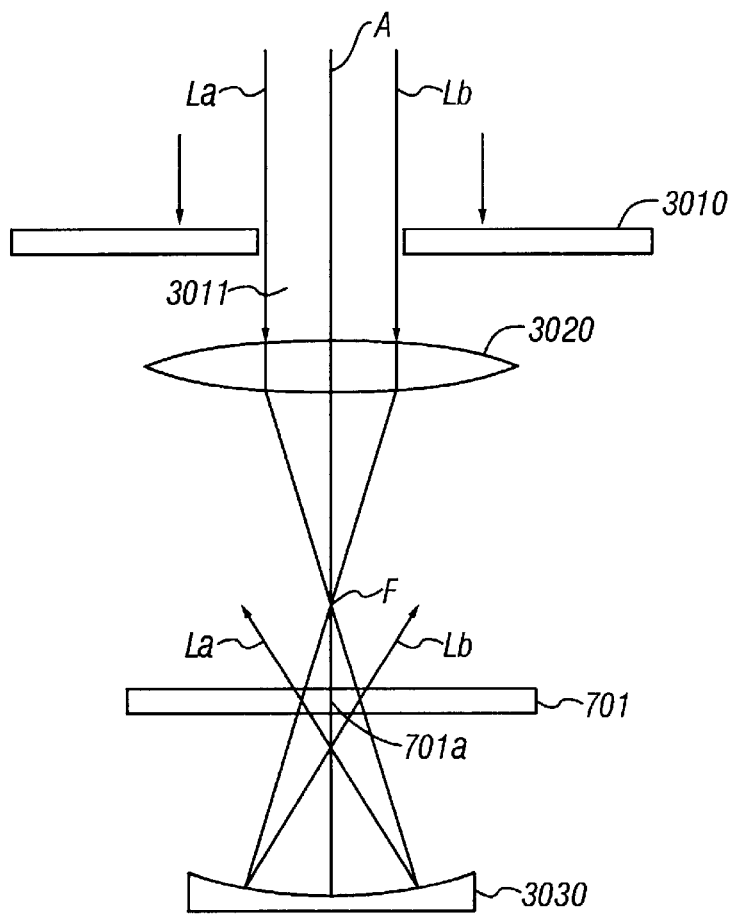
FIG. 11 is a figure showing the principle of a method for removing the insulation films of wires.

FIG. 11 is a figure showing the principle of the method for removing the insulation film of a wire.

As shown in FIG. 11, above and below the wire 701, here are provided a convex lens 3020 and a concave mirror 3030 having a common optical axis A extending in the vertical direction in the figure. Above the convex lens 3020, there is provided a mask 3010 having an opening portion 3011. The opening portion 3011 is formed so as to correspond to the connecting portion 701a of the wire 701. Above the mask 3010, there is provided a laser light source, not shown. For simplicity, it is assumed that the optical axis A of the convex lens 3020 and the concave mirror 3030 passes through the central axis of the wire 701.

The laser beam emitted from the laser light source, not shown, is assumed to be a parallel ray advancing downwards, as shown by arrows in FIG. 11, and it is irradiated to the mask 3010. The laser beam irradiated to the opening portion 3011 passes through the opening portion 3011, and the laser beam irradiated to the portion other than the opening portion 3011 is reflected by the mask 3010.

The laser beam passing through the opening portion 3011 is deflected by the convex lens 3020, converged to a focal point on the optical axis A above the wire 701, and then it is diverged and irradiated to the wire 701. By this, the insulation film on the top side of the connecting portion 701a of the wire 701 is removed. The laser beam is further diverged as it advances downwards, and irradiated to the concave mirror 3030. The laser beam is reflected by the concave mirror 3030, advances upwards, and it is irradiated to the wire 701. By this, the insulation film on the underside of the connecting portion 701a of the wire 701 is removed.

As described above, by providing the concave mirror 3030 below the wire 701, and upwardly reflecting the laser beam downwardly irradiated from above the wire 701, the insulation films on the top side and the underside of the connecting portion 701a of the wire 701 can be simultaneously removed.

More specifically, the left end and the right end of the opening portion 3011 of the mask 3010 are formed at the same distance from the optical axis A. The laser beam La passing by the left end of the opening portion 3011 is deflected by the convex lens 3020, irradiated to the top side at the right end of the connecting portion 701a of the wire 701, further reflected by the concave mirror 3030, and irradiated to the underside at the left end of the connecting portion 701a. On the other hand, the laser beam Lb passing by the right end of the opening portion 3011 of the mask 3010 is deflected by the convex lens 3020, irradiated to the top side at the left end of the connecting portion 701a of the wire 701, further reflected by the concave mirror 3030, and irradiated to the underside at the right end of the connecting portion 701a of the wire 701.

The convex lens 3020 and the concave mirror 3030 are arranged so that the laser beam deflected by the convex lens 3020 and irradiated to a certain point on the top side of the connecting portion 701a of the wire 701 is reflected by the concave mirror 3030 to a point on the underside of the connecting portion 701a of the wire 701 that is symmetric about the optical axis A with respect to the above point.

However, if arrangement is made so that the optical axis A passes through the central axis of the wire 701, the shade of the connecting portion 701a itself of the wire 701 is made when the laser beam deflected by the convex lens 3020 is irradiated to the connecting portion 701a, and the shade is also cast on the laser beam reflected by the concave mirror, so it is difficult to completely remove the insulation film on the underside of the connecting portion 701a of the wire 701. For this, the optical axis A is arranged so that it does not pass through the central axis of the wire 701. The following description is made to the method of removing the insulation films on the respective connecting portions 701a, 702a, 703a, and 704a of the wires 701, 702, 703, and 704.

Figure 12:
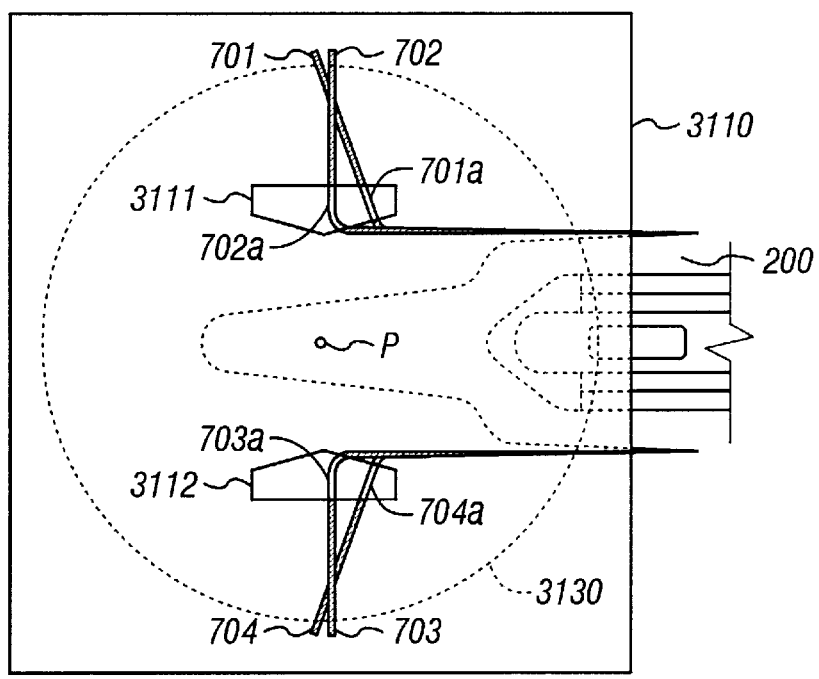
FIG. 12 is a figure showing the main portions of a laser irradiating apparatus.

FIG. 12 is a figure showing the main portions of the laser irradiating apparatus. The suspension assembly 1000 is set in the laser irradiating apparatus. As shown in FIG. 12, a concave mirror 3030 is placed below the suspension assembly 1000, and a mask 3110 is placed above the suspension assembly 1000. In FIG. 12, the A-side tab frame 400 and the B-side tab frame 500 of the suspension assembly 1000 are omitted. Further, the laser light source, convex lens, or the like of the laser irradiating apparatus are omitted.

The suspension assembly 1000 is fixed to the laser irradiating apparatus so that the common optical axis P of the convex lens (not shown) and the concave mirror 3130 is located on the central axis of the load beam 200 (suspension assembly 1000) that is slightly offset to the top side thereof from the connecting portions 702a of the wire 702, bent substantially perpendicularly, and the connecting portion 703a of he wire 703.

In the mask 3110, there are provided an opening portion 3111 and an opening portion 3112 which are formed symmetrically on the A side and the B side with respect to the central axis of the load beam 200. The opening portions 3111 and 3112 are both shaped in a pentagon, and the line connecting the respective vertexes projecting to the central axis side of the load beam 200 passes through the optical axis P. Further, the opening portions 3111 and 3112 are symmetrical with respect to a plane passing through the optical axis P and orthogonal to the central axis of the load beam 200, respectively. That is, the opening portions 3111 and 3112 are formed so that they make point symmetry about the optical axis P.

The rear side (in the figure, right half) of the opening portion 3111 is provided to irradiate a laser beam to the top side of the connecting portion 701a of the wire 701 and the connecting portion 702a of the wire 702. On the other hand, the top side (in the figure, left half) of the opening portion 3111 is provided to irradiate a laser beam to the underside of the connecting portion 703a of the wire 703 and the connecting portion 704a of the wire 704.

The rear side (in the figure, right half) of the opening portion 3112 is provided to irradiate a laser beam to the top side of the connecting portion 703a of the wire 703 and the connecting portion 704a of the wire 704. On the other hand, the top side (in the figure, left half) of the opening portion 3112 is provided to irradiate a laser beam to the underside of the connecting portion 701a of the wire 701 and the connecting portion 702a of the wire 702.

In addition, the shape of the opening portions 3111 and 3112 is not limited to that shown in FIG. 12. Further, the top side of the opening portion 3111, the rear side of the opening portion 3111, the top side of the opening portion 3112, and the rear side of the opening portion 3112 may be formed of different openings, respectively. They are only needed to be formed in point symmetric about the optical axis P.

Figure 13:
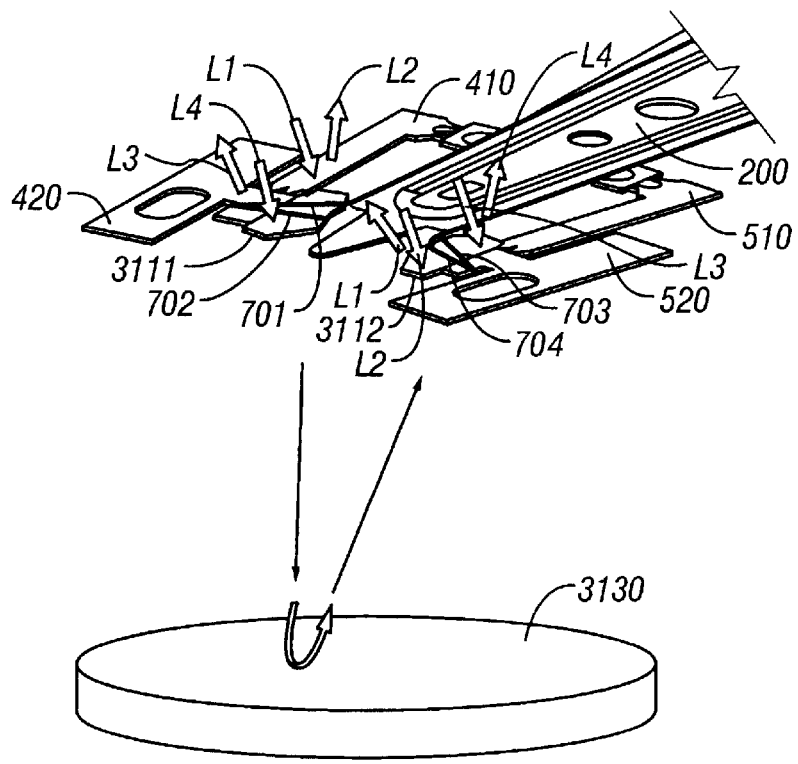
FIG. 13 is a figure showing a method for removing the insulation films of wires.

FIG. 13 is a figure showing the method for removing the insulation films of the wires. In FIG. 13, the outer frame of the mask 3110 is omitted, and the opening portions 3111 and 3112 are shown. The laser beam is irradiated from above to below the mask 3110. The insulation films of the respective connecting portions 701a, 702a, 703a, and 704a of the wires 701, 702, 703, and 704 are removed by one irradiation of the laser beam.

A laser beam L1 irradiated to the rear side of the opening portion 3111 removes the insulation films on the top side of the connecting portion 701a of the wire 701 and the connecting portion 702a of the wire 702, and it is reflected by the concave mirror 3130 to the top side of the opening portion 3112 that makes point symmetry on the same plane about the optical axis P. On the other hand, a laser beam L2 irradiated to the top side of the opening portion 3112 is reflected by the concave mirror 3130 to the rear side of the opening portion 3111 that makes point symmetry, the insulation films on the underside of the connecting portion 701a of the wire 701 and the connecting portion 702a of the wire 702 are removed. Since there is no object intercepting the laser beam on the top side of the opening portion 3112, the insulation films on the underside of the connecting portions 701a and 702a are completely removed.

Similarly, a laser beam L3 irradiated to the rear side of the opening portion 3112 removes the insulation films on the top side of the connecting portion 703a of the wire 703 and the connecting portion 704a of the wire 704, and it is reflected by the concave mirror 3130 to the top side of the opening portion 3111 that makes point symmetry on the same plane about the optical axis P. On the other hand, a laser beam L4 irradiated to the top side of the opening portion 3111 is reflected by the concave mirror 3130 to the rear side of the opening portion 3112 that makes point symmetry, and the insulation films on the underside of the connecting portion 703a of the wire 703 and the connecting portion 704a of the wire 704 are removed. Since there is no object intercepting the laser light on the top side of the opening portion 3111, the insulation films on the underside of the connecting portions 703a and 704a are completely removed.

Then, in the slider bonding step, a slider 800 is bonded to the suspension tongue 313 of the flexure 300 located on the underside of the top side of the suspension assembly 1000. On the side face of the top side of the slider 800, bonding pads 811–814 are provided in parallel. The respective connecting portion 701a, 702a, 703a, and 704a of the wires 701, 702, 703, and 704 arranged on the suspension assembly 1000 are connected to their corresponding bonding pads 811–814.

Figure 14:
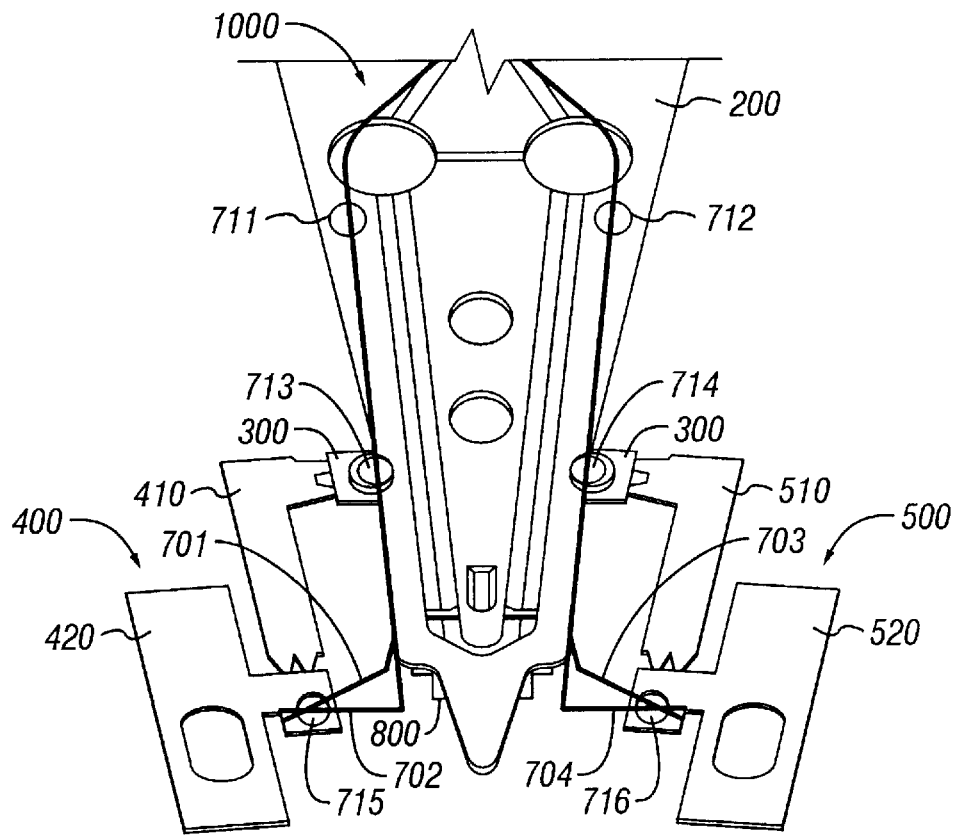
FIG. 14 is a figure showing the top end portion of the suspension assembly on which a slider is provided.
Figure 15:
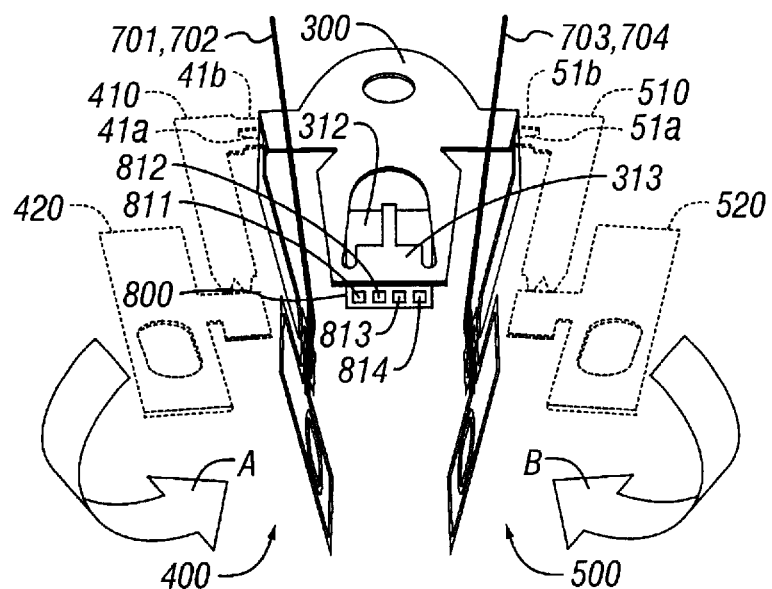
FIG. 15 is a figure showing the first frame bending step.
Figure 16:
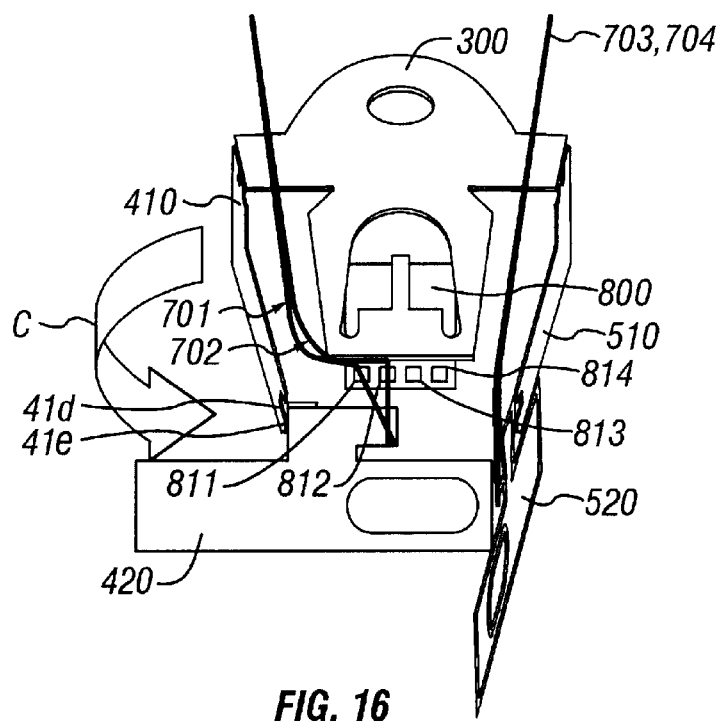
FIG. 16 is a figure showing the second frame bending step.
Figure 17:
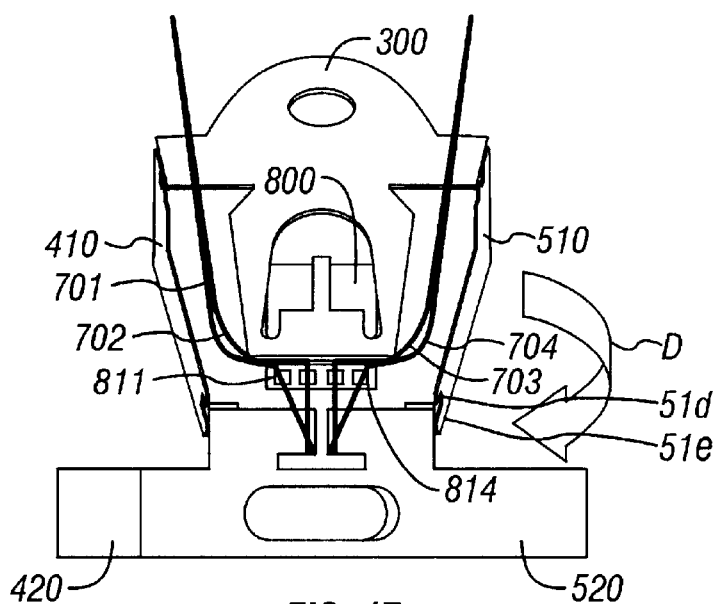
FIG. 17 is a figure showing the second frame bending step.

FIG. 14 is a drawing showing the top end portion of the suspension assembly 1000 on which the slider 800 is provided. Further, FIG. 15 is a drawing showing the first frame bending step, and FIGS. 16 and 17 are drawings showing the second frame bending step. In FIGS. 15 and 16, the load beam 200 is omitted for convenience.

In the first frame bending step, the A-side tab frame 400 is bent substantially perpendicularly with respect to the flexure 300 in the direction of an arrow A at the connecting portions 41a and 41b of the first frame 410, as shown in FIG. 15. The B-side tab frame 500 is bent substantially perpendicularly with respect to the flexure 300 in the direction of an arrow B at the connecting portions 51a and 51b of the first frame 510. By this, the wires 701 and 702 are twisted in the direction of the arrow A in the portions thereof extending longitudinally of the suspension assembly 1000, while the wires 703 and 704 are twisted in the direction of the arrow B in the portions thereof extending longitudinally of the suspension assembly 1000.

Then, in the second frame bending step, the second frame 420 of the A-side tab frame 400 is bent substantially perpendicularly with respect to the first frame 410 in the direction of an arrow C at the connecting portions 41d and 41e of the first frame 410, as shown in FIG. 16. By this, the wires 701 and 702 are bent in the direction of the arrow C in the top end of the portions thereof extending longitudinally of the suspension assembly 1000.

The portion (including the connecting portion 701a) of the wire 701 beyond the bending position by the wire positioning pin 2021, and the portion (including the connecting portion 702a) of the wire 702 beyond the bending position by the wire positioning pin 2022 are bent so that they are given a sufficient fold by the wire positioning pins 2021 and 2022, respectively, and bonded to the plane portion 420a of the second frame 420 by the bonding agent 715, and are short in length, so they do not deform.

This allows the wire 701 to pass through the central portion of the bonding pad 811 on the slider 800, and its connecting portion 701a is in contact with or close to the bonding pad 811. The wire 702 passes through the central portion of the bonding pad 812 on the slider 800, and the connecting portion 702a is in contact with or close to the bonding pad 812.

Then, as shown in FIG. 17, the second frame 520 of the B-side tab frame 500 is bent substantially perpendicularly with respect to the first frame 510 in the direction of an arrow D at the connecting portions of the connecting portions 51d and 51e of the second frame 520. By this, the wires 703 and 704 are bent in the direction of the arrow D.

The portion (including the connecting portion 703a) of the wire 703 beyond the bending position by the wire positioning pin 2023, and the portion (including the connecting portion 704a) of the wire 704 beyond the bending position by the wire positioning pin 2024 are bent so that they are given a sufficient fold by the wire positioning pins 2023 and 2024, respectively, and bonded to the plane portion 520a of the second frame 520 by the bonding agent 716, and are short in length, so they do not deform.

Figure 18:
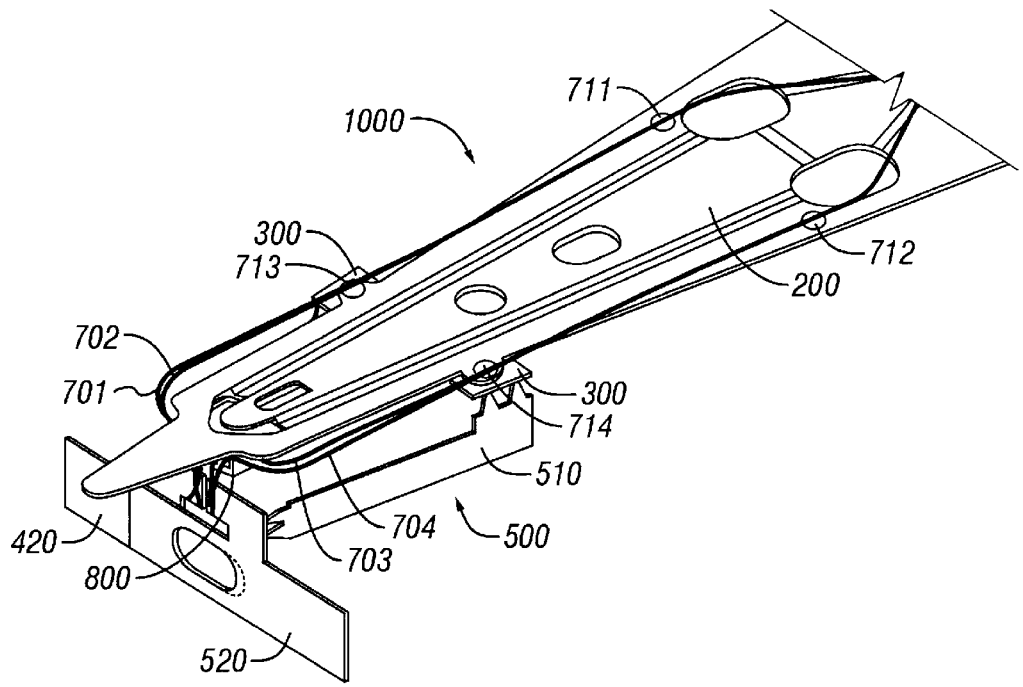
FIG. 18 is a perspective view of the top end portion of the suspension assembly shown in FIG. 17.

This allows the wire 703 to pass through the central portion of the bonding pad 813 on the slider 800, and its connecting porrtion 703a is in contact with or close to the bonding pad 813. The wire 704 passes through the central portion of the bonding pad 814 on the slider 800, and its connecting portion 704a is in contact with or close to the bonding pad 814. A perspective view of the top end portion of the suspension assembly 1000 in this state is shown in FIG. 18.

Then, in the ultrasonic welding step, the respective connecting portions 701a, 702a, 703a, and 704a of the wires 701, 702, 703, and 704 are connected to the respective bonding pads 811–814 by the conventionally known ultrasonic welding apparatus, not shown. With this, the A-side tab frame 400 and the B-side tab frame 500 complete their roles. The wires 701 and 702 are cut off from the second frame 420 of the A-side tab frame 400, and the wires 703 and 704 are cut off from the second frame 520 of the B-side tab frame 500. The A-side tab frame 400 and the B-side tab frame 500 are returned to the state in which they are in prior to the bending, and cut off from the flexure 300 (tab frame separation step).

Figure 19:
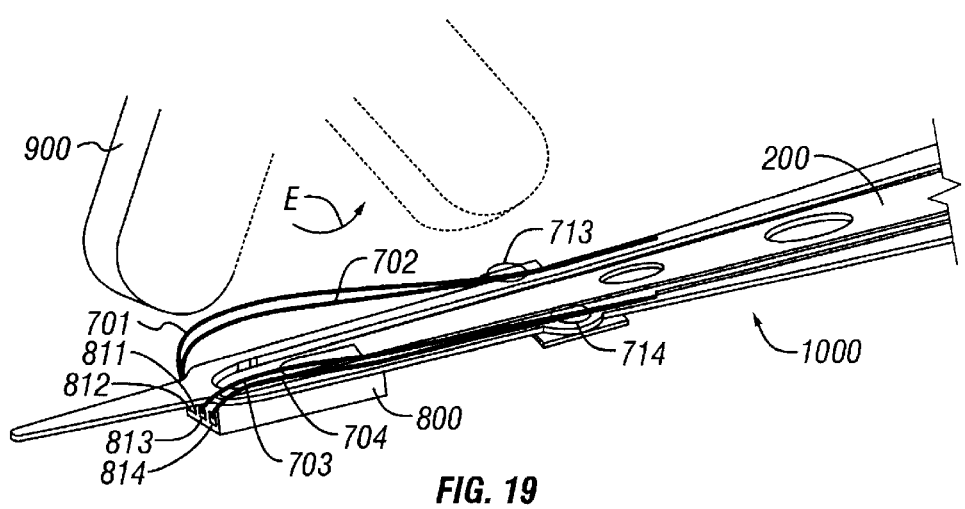
FIG. 19 is a figure showing the wire flattening step.

Since the wires 701–704 connected to the bonding pads 811–814 are three-dimensionally bent by the first and second frame bending steps, they rise upwards and curve, as shown in FIG. 19, by the internal stress to untwist them.

In the wire flattening step, the curved wires 701–704 are pressed downwards by a molding pin 900 rotating in the direction of an arrow E, as shown in FIG. 19, thereby to plastically deform and flatten the wires 701–704. By this, the residual internal stress of the wires 701–704 can be removed to stabilize their shapes. Further, since the rise in the direction of height can be flattened, the height of the HSA can be decreased to suppress the turbulence of the air flow produced by the curved wires 701–704. Accordingly, the attitude of the HSA can be stabilized. The method for flattening the wires 701–704 is not limited to the method by the molding pin 900, but it can be implemented by various methods.

The head suspension assembly of this embodiment is assembled by the wiring method described above. In accordance with the wiring method of this embodiment, the four wires 701–704 led from the rear side to the top side of the suspension assembly 1000 are bent at predetermined positions, respectively.

In the conventional wiring method shown in FIGS. 20 and 21, the suspension assembly 1 is configured such that, to connect the four wires 40 led from the rear side to the top side of the load beam 10 to the corresponding bonding pads 51 on the slider 50 facing the opening window 13, the four wires 40 led from the rear side to the top side of the load beam 10 are led to the second plane portion 33c of the C-side frame 33 of the tab frame 30 located on the top side of the load beam 10. Thus, the four wires 40 are arranged in a straight line.

On the other hand, in this embodiment, the wires 701–704 led from the rear side to the top side of the suspension assembly 1000 are bent in a largely beveled direction with respect to the central axis of the suspension assembly 1000, and led to the respective bondable locations of the A-side tab frame 400 and the B-side tab frame 500. Accordingly, the wires can be led to any location and direction coplanar with the suspension assembly 1000, and arranged in more various shapes.

Further in this embodiment, the wires 701–704 are wound around the wire positioning pins 2021–2024 of the HSA assembly stand 2000 and bent. Thus, each can easily be bent. Furthermore, the wire positioning pins 2021–2024 are arranged on the HSA assembly stand 2000 with good precision. Accordingly, the wires 701–704 can be arranged with high precision.

Further, the wires 701–704 wound around the respective wire positioning pins 2021–2024 and bent are wound around the respective wire positioning pins 2031–2034. Thus, the directions of the wires 701–704 bent by the wire positioning pins 2021–2024 can be accurately defined. Accordingly, the wires 701–704 can arranged with higher precision.

The wires 701 and 702 are bent by the respective wire positioning pins 2021 and 2022 at different positions, and led in different directions (angles with respect to the central axis). Similarly, the wires 703 and 704 are bent by the respective wire positioning pins 2023 and 2024 at different positions, and led in different directions. This depends on the relationships between the wire positioning pins 2021–2024 and the four bonding pads 811–814 on the slider 800.

The bonding pad 811–814 are placed with a pith of about 0.18 mm. On the other hand, the diameter of the wire positioning pins 2021–2024 is in the order or 0.2 mm. Accordingly, the wire positioning pins 2021 and 2022 cannot be arranged with the pitch of the bonding pads 811–814, and the wire positioning pins 2023 and 2024 cannot be arranged with the pitch of the bonding pads 811–814.

Thus, the wires 701 and 702 are led by the respective wire positioning pins 2021 and 2022 so that they cross each other on the plane portion 420a of the second frame 420 of the A-side tab frame 400. By this, the distance between the wire 701 and the wire 702 inside the second frame 420 can be made smaller than the distance between the wire positioning pin 2021 and the wire positioning pin 2022, and the distance between the connecting portions of the wires 701 and 702, which are positioned so as to be in contact with or close to the respective bonding pads 811 and 812 by the first and second frame bending steps, can be made to match the pitch of the bonding pads 811–814.

Similarly, the wires 703 and 704 are led so as to cross each other on the plane portion 520a of the second frame 520 of the B-side tab frame 500. By this, the distance between the wire 703 and the wire 704 inside the second frame 520 can be made smaller than the distance between the wire positioning pin 2023 and the wire positioning pin 2024, and the distance between the connecting portions of the wires 703 and 704, which are positioned so as to be contact with or close to the respective bonding pads 813 and 814 by the first and second frame bending steps, can be made to match the pitch of the bonding pads 811–814.

Accordingly, by the first and second frame bending steps, the wires 701–704 arranged on the suspension assembly 1000 can be three-dimensionally bent so as to be led to the connection positions of the corresponding bonding pads 811–814 on the slider 800 with good precision.

In this embodiment, the A-side tab frame 400 and the B-side tab frame 500 are molded integrally with the flexure 300 to form the flexure assembly 1500, but the A-side tab frame 400 and the B-side tab frame 500 may be molded integrally with the load beam 200 instead of the flexure 300. Which way to take can be decided in consideration of the easiness and cost of the manufacture of each member, or the like.

Further, in this embodiment, by arranging two wires 701 and 702 on the A side of the suspension assembly 1000, and arranging two wires 703 and 704 on the B side of the suspension assembly 1000, the wires 701–704 are formed in a symmetrical shape about the central axis of the suspension assembly 1000. By this, the wire positioning is made easy, and the A side and the B side of the suspension assembly 1000 can be balanced. However, this means no restriction, and it is also possible that a tab frame is provided only on one side of the suspension and a plurality of wires is arranged on the other side of the suspension assembly.

Advantages of the Present Invention

In accordance with the first wiring method for head suspension assembly related to this invention, a plurality of wires led from the rear side to the top side of the suspension assembly is bent on a predetermined location. Accordingly, the wires can be led to any position and direction substantially coplanar with the suspension assembly, and they can be arranged in any form.

Further, in accordance with the head suspension assembly stand related to this invention, a plurality of wires led from the rear side to the top side of the suspension assembly are wound around a plurality of first pins and bent. Thus, each wire can easily be bent by a pin positioned at the bending location with good precision. Accordingly, the wires can be arranged with high precision.

Further, in accordance with the flexure assembly, suspension assembly, and second wiring method for head suspension assembly which are related to this invention, the wires led from the rear side to the top side of the suspension assembly are bonded to the bonding portion of the second frame of the tab frame. And, the first frame is bent substantially perpendicularly with respect to the suspension assembly, and then the second frame is bent substantially perpendicularly with respect to the first frame. By this, the respective connecting portions of the plurality of wires can be easily and precisely led to the connection positions with the respective connecting pads on the slider.

What is claimed is:

1. A method of wiring a head suspension assembly, comprising the steps of:

preparing a suspension assembly comprising a suspension for elastically supporting a slider on which a magnetic head of a disk storage device is provided, and a tab frame formed integrally with the suspension so that the tab frame and a peripheral suspension on a top side of the suspension are substantially coplanar, the tab frame having bonding portions to which a plurality of wires are each bonded for electrically connecting the magnetic head and a controller which transmits data relative to the magnetic head, the tab frame having a first frame integrally connected to the suspension and being bendable substantially perpendicular to the suspension, and a second frame including the bonding portions, integrally connected to the first frame, and being bendable substantially perpendicular to the first frame;

a first fixing step for fixing a tube binding the plurality of wires on a predetermined location on the suspension assembly;

a second fixing step for fixing the plurality of wires extending from the fixed tube on a predetermined location on the suspension, while leading them to a top side of the suspension, to which the slider on which the magnetic head is provided is attached;

a third fixing step for bonding each wire led to the top side of the suspension to the bonding portions of the second frame of the tab frame;

an insulation film removing step for removing the insulation film of each connecting portion of the plurality of wires to connect the plurality of wires to respective connecting pads of the slider;

a first frame bending step for bending the first frame substantially perpendicular to the suspension;

a second frame bending step for bending the second frame substantially perpendicular to the first frame, thereby to position the connecting portion of the plurality of wires bonded to the bonding portions of the second frame at the respective connecting pads on the slider; and an ultrasonic welding step for ultrasonically welding the plurality of wires to the respective connecting pads on the slider.

2. The wiring method of claim 1, further comprising a wire flattening step in which, after the ultrasonic welding step, each wire having risen from the suspension and curved by an internal stress for untwisting by the first and second frame bending steps is plastically deformed to the suspension side and flattened.

* * * * *

UNITED STATES PATENT AND TRADEMARK OFFICE
CERTIFICATE OF CORRECTION

PATENT NO. : 6,553,647 B1
DATED : April 29, 2003
INVENTOR(S) : Kenji Itoh et al.

It is certified that error appears in the above-identified patent and that said Letters Patent is hereby corrected as shown below:

Column 10,
Lines 24, 25, 30, 33, 34, 42, 43, 44, 50, 52 and 54, please replace the word "damper" with the word -- clamper --.

Column 11,
Lines 2, 7, 10, 11, 13, 14, 36, 56, 62 and 63, please replace the word "damper" with the word -- clamper --.
Line 66, please replace the word "damper" with the word -- clamper -- between the words "wire" and "2043,".
Line 66, please replace the word "damper" with the word -- clamper -- between the words "wire" and "2044".

Column 12,
Lines 6, 7 and 61, please replace the word "damper" with the word -- clamper --.
Line 14, please replace the word "cdampers" with the word -- clampers --.

Column 13,
Lines 6, 7 and 17, please replace the word "dampers" with the word -- clampers --.
Line 11, please replace "3A" with -- SA --.
Line 62, please replace the word "damper" with the word -- clamper --.

Column 14,
Lines 5, 16 and 27, please replace the word "damper" with the word -- clamper --.
Lines 37 and 56, please replace the word "dampers" with the word -- clampers --.

UNITED STATES PATENT AND TRADEMARK OFFICE
CERTIFICATE OF CORRECTION

PATENT NO.   : 6,553,647 B1
DATED        : April 29, 2003
INVENTOR(S)  : Keni Itoh et al.

It is certified that error appears in the above-identified patent and that said Letters Patent is hereby corrected as shown below:

Column 15,
Line 6, please delete the period "." after the word -- tab --.

Signed and Sealed this

Ninth Day of September, 2003

JAMES E. ROGAN
*Director of the United States Patent and Trademark Office*